US012344467B2

(12) United States Patent
Reeb et al.

(10) Patent No.: US 12,344,467 B2
(45) **Date of Patent: *Jul. 1, 2025**

(54) LOCKING DEVICE AND METHOD

(71) Applicant: Serio-Us Industries, Inc., Baltimore, MD (US)

(72) Inventors: David L. Reeb, Sykesville, MD (US); James L. Martin, II, Gambrills, MD (US)

(73) Assignee: Serio-Us Industries, Inc., Baltimore, MD (US)

( * ) Notice: Subject to any disclaimer, the term of this patent is extended or adjusted under 35 U.S.C. 154(b) by 721 days.

This patent is subject to a terminal disclaimer.

(21) Appl. No.: 17/120,708

(22) Filed: Dec. 14, 2020

(65) Prior Publication Data

US 2021/0094758 A1 Apr. 1, 2021

Related U.S. Application Data

(63) Continuation-in-part of application No. 16/154,904, filed on Oct. 9, 2018, now Pat. No. 11,459,171.

(Continued)

(51) Int. Cl.

*B65F 1/16* (2006.01)
*E05B 65/52* (2006.01)
*E05C 19/00* (2006.01)

(52) U.S. Cl.

CPC ........ *B65F 1/1615* (2013.01); *E05B 65/5292* (2013.01); *E05C 19/003* (2013.01); *B65F 2210/148* (2013.01)

(58) Field of Classification Search

CPC ................. E05C 19/003; E05C 19/005; E05C 2005/005; E05C 5/00; E05C 5/02; E05B 15/0093; E05B 63/0052; E05B 67/383; E05B 15/006; E05B 65/006; E05B 65/48; E05B 65/02; E05B 65/5207; E05B 65/5215; E05B 65/523; E05B 65/5246; E05B 65/5253; E05B 65/5261; E05B 65/5269; E05B 65/5276; E05B 65/5292; B65F 1/122; B65F 1/16; B65F 1/1607; B65F 1/1615; B65F 1/1646; B65F 2210/1446; B65F 2210/148; B65F 2001/1669; B65D 43/164; Y10T 292/0886; Y10T 292/0887;

(Continued)

(56) References Cited

U.S. PATENT DOCUMENTS 4,163,443 A * 8/1979 Peterson ............... F24C 15/022 292/216
5,662,364 A * 9/1997 Reeb ..................... B65F 1/1615 292/230

(Continued)

*Primary Examiner* — Teri P Luu
*Assistant Examiner* — Peter H Watson
(74) *Attorney, Agent, or Firm* — CALDERON SAFRAN & WRIGHT P.C.

(57) ABSTRACT

The present invention generally relates to waste containers and, more particularly, relates to a locking device for waste containers. The locking device is gravity actuated to an opened position on tilting of the container for dumping. The locking device allows the lid of the container, when the container is in an upright position, to be locked to prevent unauthorized access to the container. When the container is tilted from the upright position, e.g. to empty the contents of the container, the locking device is gravity actuated to allow the lid to open.

20 Claims, 21 Drawing Sheets

Related U.S. Application Data

(60) Provisional application No. 62/569,676, filed on Oct. 9, 2017.

(58) Field of Classification Search
CPC ........... Y10T 292/0889; Y10T 292/089; Y10T 292/0893; Y10T 292/0913; Y10T 292/0914; Y10T 292/0915; Y10T 292/0917
USPC .......................... 220/326, 830, 827, 828, 810
See application file for complete search history.

(56) References Cited

U.S. PATENT DOCUMENTS

| | | | | | |
|---|---|---|---|---|---|
| 5,997,052 | A * | 12/1999 | Reeb | E05B 15/0093 | 292/148 |
| 11,459,171 | B2 * | 10/2022 | Reeb | B65F 1/1615 | |
| 2009/0066092 | A1 * | 3/2009 | Reeb | B65F 1/1615 | 292/184 |
| 2014/0306465 | A1 * | 10/2014 | Kreitzer | E05F 1/002 | 292/305 |
| 2015/0314957 | A1 | 11/2015 | Reeb | | |
| 2016/0355334 | A1 * | 12/2016 | Reeb | E05B 65/52 | |
| 2017/0190509 | A1 | 7/2017 | Reeb et al. | | |
| 2017/0320665 | A1 | 11/2017 | Reeb et al. | | |
| 2018/0371802 | A1 * | 12/2018 | Rodaer | E05B 67/24 | |
| 2019/0106278 | A1 | 4/2019 | Reeb et al. | | |

* cited by examiner

LOCKING DEVICE AND METHOD

CROSS-REFERENCE TO RELATED APPLICATIONS AND CLAIM TO PRIORITY

This application is a continuation-in-part of U.S. patent application Ser. No. 16/154,904, filed Oct. 9, 2018, which claims the priority of U.S. Provisional Patent Application No. 62/569,676, filed Oct. 9, 2017, the disclosures of which are incorporated herein by reference.

FIELD OF THE INVENTION

The present invention generally relates to waste containers and, more particularly, to a locking device for waste containers. The locking device is gravity actuated to an opened position on tilting of the container for dumping.

BACKGROUND OF THE INVENTION

As is well known, waste containers, such as refuse containers for use in residential and industrial applications, typically include a container supported on a base structure. With the advent of mechanized trash removal, there have been created a number of large sized trash bins or dumpsters. These containers usually comprise a block-shaped or pyramid-shaped container with a hinged lid attached to one side thereof. The container further includes attachments for accommodating various lifting mechanisms of a trash removal vehicle. Each container is lifted by the lifting mechanism of the trash removal vehicle and pivoted in some fashion, so that the hinged top of the container opens and the trash contained therein may be emptied into the vehicle. The container is then returned to a position on the ground, and the hinged lid closes on top of the container. Many of these large trash receptacles are rented from a trash removal service. These receptacles are not provided free of charge, and consequently their frequent emptying and service can become a considerable expense. This expense is increased when unauthorized users deposit trash therein. This unauthorized use necessitates a more frequent emptying of the container, and of course the unauthorized user does not contribute to the increased expense attributable to the need for more frequent dumping.

In order to reduce the added expense that comes from unauthorized use, the dumpster/container may be locked. While conventional chains and padlocks reduce unauthorized dumpster use, they also add to operating expenses because the driver of the truck emptying the dumpster must get out of the truck to unlock the padlock on the dumpster and then reverse the process after emptying. For decades, companies have been developing and marketing dumpster locking mechanisms that open automatically when the dumpster is lifted and inverted to dump the trash into the truck. With such as automatic lock, the driver is not required to leave the truck, which saves the trash company hundreds of dollars each year.

Conventional automatic locks are typically bulky, expensive and difficult to mount to multiple/different containers. Since containers come in a variety of shapes and sizes, it is important that the locking device be sized and shaped to be retrofit onto a variety of existing containers. Moreover, the locking device must be able to withstand the rigors of everyday, outdoor use in the waste environment.

Therefore, there exists a need for an automatic locking device that improves upon prior automatic locking devices and solves the problems inherent in known automatic locking devices.

SUMMARY OF THE INVENTION

A first aspect of the invention provides a locking device for a container having a hinged lid. The container has a hinged lid that is movable between an upright storing position and a tilted dumping position for emptying the container. The locking device allows the lid of the container, when the container is in an upright position, to be locked to prevent unauthorized access to the container. When the container is tilted from the upright position, e.g. to empty the contents of the container, the locking device is gravity actuated to allow the lid to open.

The locking device contains a base unit and a pivotable unit pivotally mounted to the base unit. The base unit is adapted to be fixed to the container and contains a locking mechanism therein. The locking mechanism contains a sliding member, a rolling member, a biasing member, and a connecting member. The connecting member allows the locking mechanism to be connected to the pivotable unit. The rolling member is affected by gravity to be in the blocked position when the container is upright and in the unblocked position when the container is tilted past a predetermined angle. In the blocked position, the sliding member is blocked from sliding forwardly to allow the locking device to be placed in the opened position. In the unblocked position, the sliding member may slide forwardly to place the locking device in the opened position. The biasing member functions to retract the sliding member to the blocked position when dumping operation has completed.

A second aspect of the invention provides a container having a hinged lid over an opening thereof and a locking device mounted to a first side wall of the container. A support member is mounted to a second side wall, opposing the first side wall. The support member has a pivoting arm pivotally mounted thereto. A locking bar connects the pivoting unit and the pivoting arm. In the closed position, the locking bar is positioned over the hinged lid to prevent it from opening. In the open position, the locking bar is spaced away from the hinged lid to allow it to be lifted away from container, thereby opening the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF THE PREFERRED EMBODIMENT(S)

Figure 1:
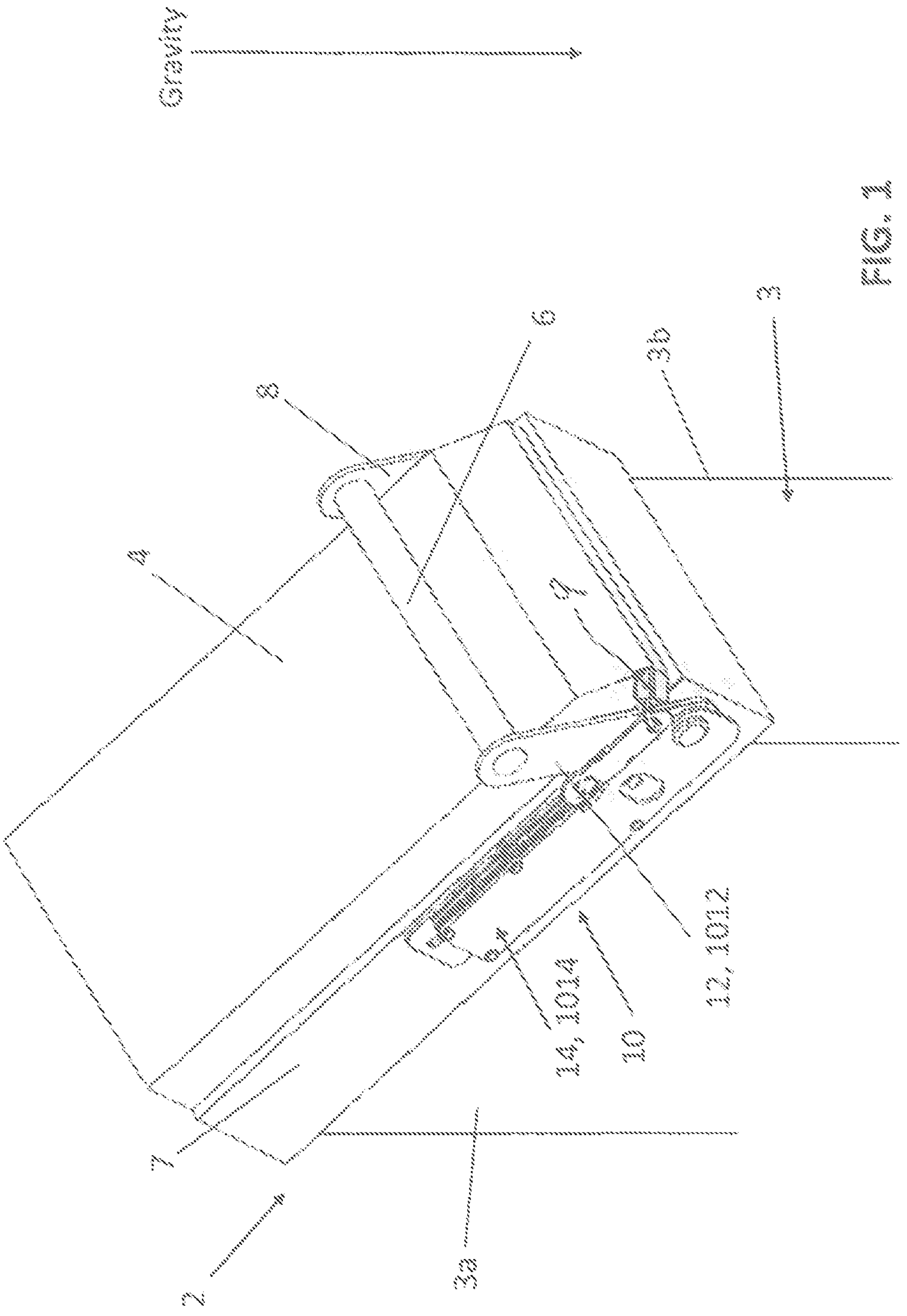
FIG. 1 is a fragmentary perspective view from a side of a waste container in an upright position with a locking device in a close position.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top", "bottom", "forward", and "backward" as well as derivatives thereof (e.g., "horizontally," "downwardly," "upwardly," etc.) should be construed to refer to the orientation as then described or as shown in FIGS. 3-4 and 15-16. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Additionally, the word "a" and "an" as used in the claims means "at least one" and the word "two" as used in the claims means "at least two".

Figure 2:
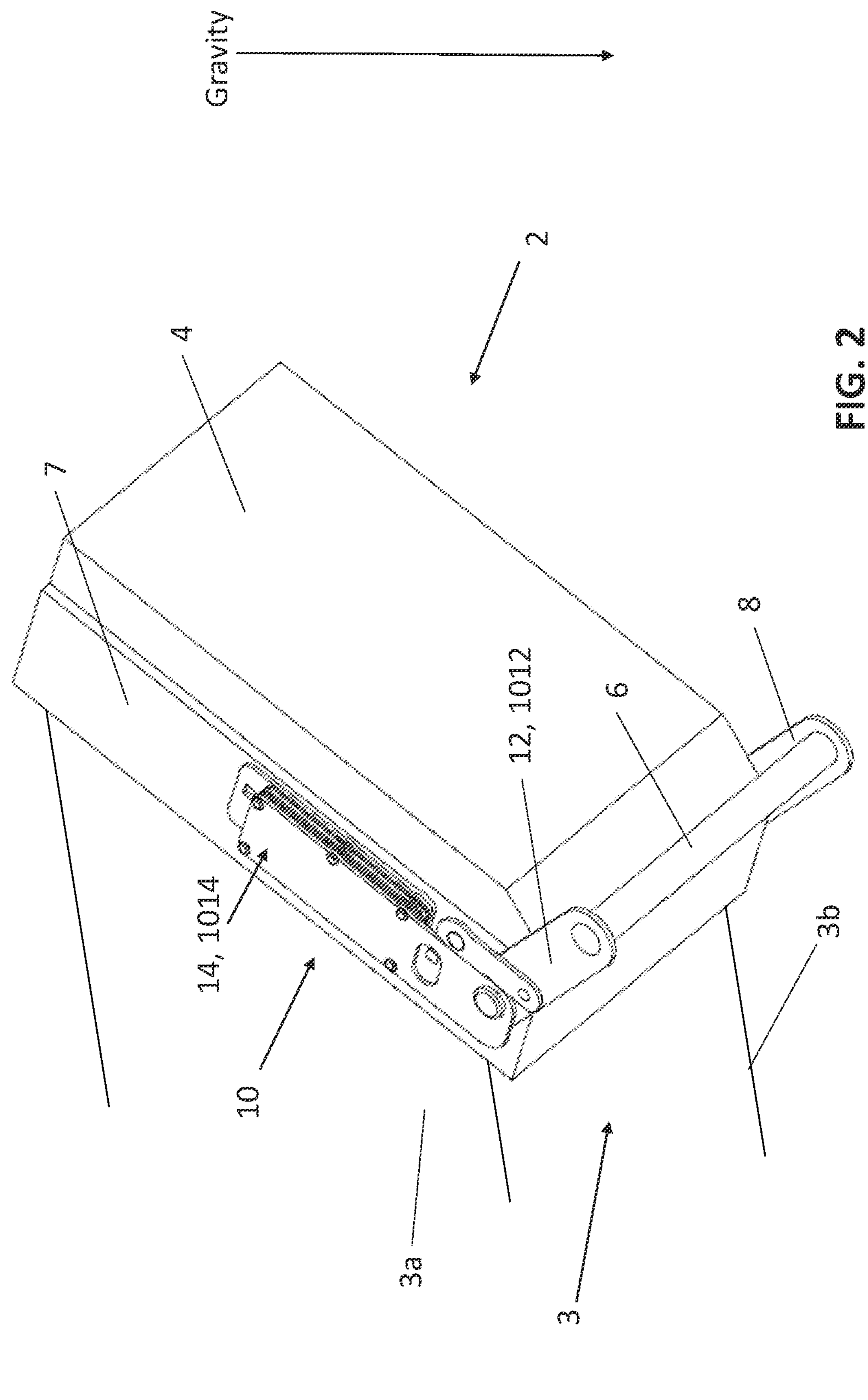
FIG. 2 is a fragmentary perspective view of the waste container of FIG. 1 in a tilted position with the locking device in the open position.

FIGS. 1-2 illustrate a waste container 2, such as a trash collector or dumpster, including a container body 3, at least one hinged lid 4 pivotally mounted thereto, a safety locking device 10 and a locking bar 6 extending across the top of the waste container 2. The locking device 10 is provided for locking and unlocking the hinged lid 4 of the container 2 to prevent unauthorized access to it. The locking bar 6 extends between the locking device 10 at one end and a pivoting arm 8 at the other end of container body 3. The locking device 10 is preferably mounted to a side wall 3*a* of the container body 3 (herein defined as a lock side of the container body 3), while the pivoting arm 8 is preferably pivotally mounted to the opposite side wall 3*b* thereof (herein defined as a dummy side of the container body 3). Although the drawings show the lock side as the right side of the container body 3 and the dummy side (for mounting a support member) as the left side of the container body 3, the reverse is also within the scope of the present invention, where the lock side is the left side of the container body 3 and the dummy side is the right side of the container body 3. The lock side and the dummy side may be located anywhere on the container as long as the locking bar 6 may be positioned over the lid 4 to block the opening of the container 2, and moved to be spaced from the lid 4 to allow opening of the container 2. The locking device 10 may be mounted to a flanged lip 7 of the container body 3 or directly to a side of the container body 3.

The container 2, as illustrated in FIGS. 1-2, is generally an industrial-type dumpster used for retaining, storing, and eventually disposing of refuse (waste). The container 2 may be tilted or otherwise pivoted from an upright (or on-the-ground) position (wherein the waste container 2 is sitting generally horizontally on the ground) (shown in FIG. 1) to a tilted or dumping position (shown in FIG. 2).

Figure 3:
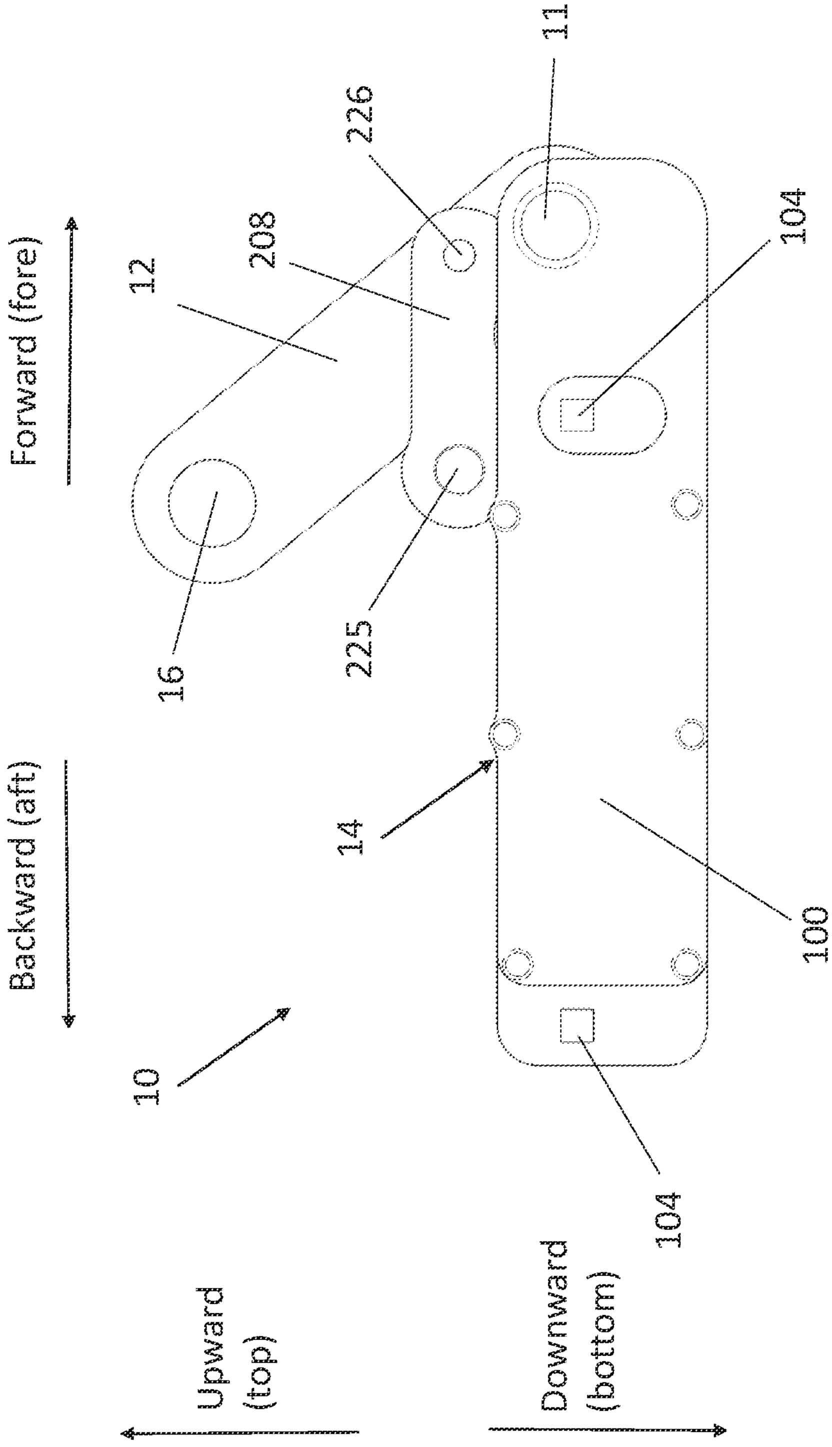
FIG. 3 is a side view of a first embodiment of the locking device from the outer side.
Figure 4:
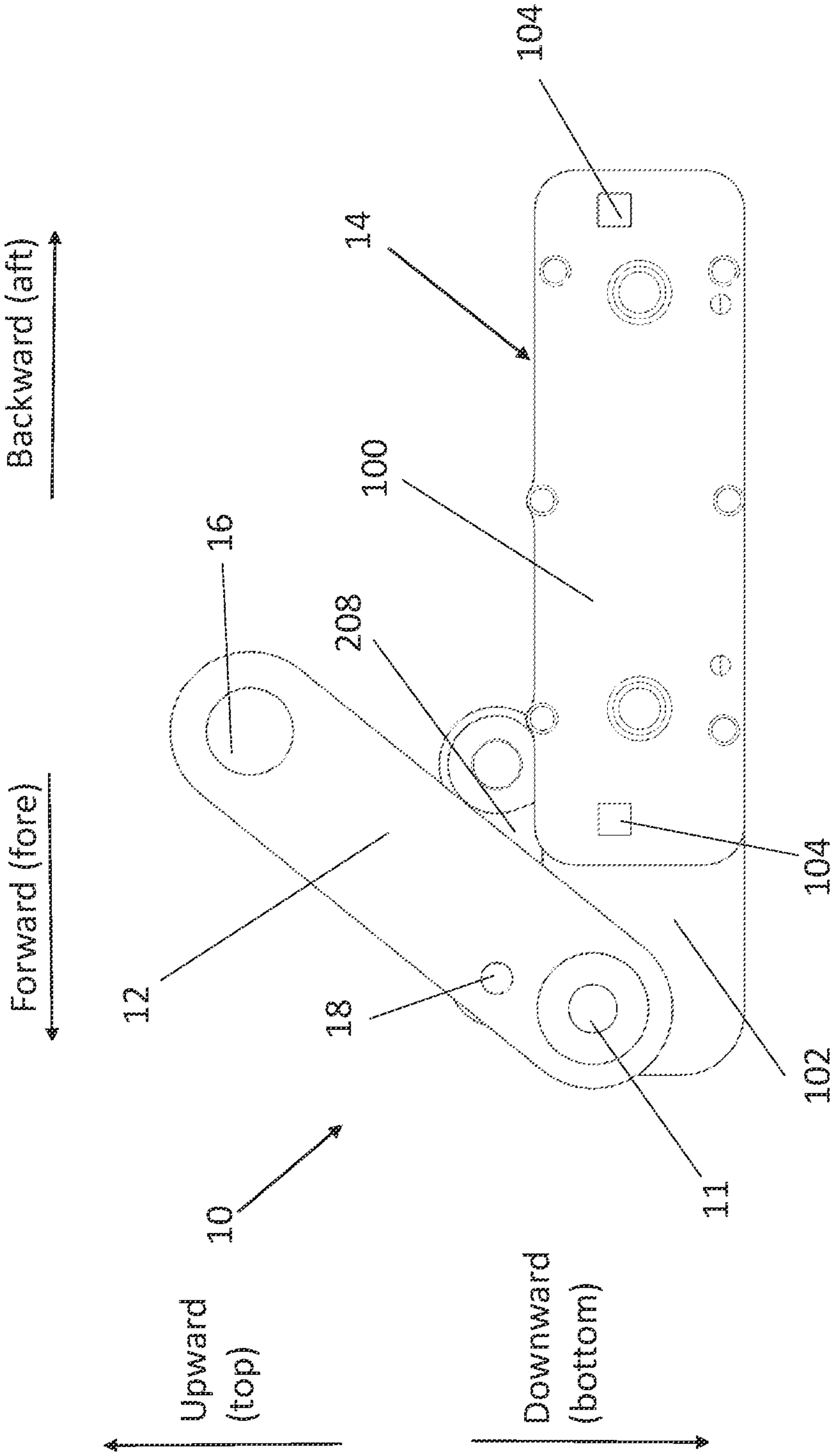
FIG. 4 is a side view of the first embodiment of the locking device from the inner side.
Figure 15:
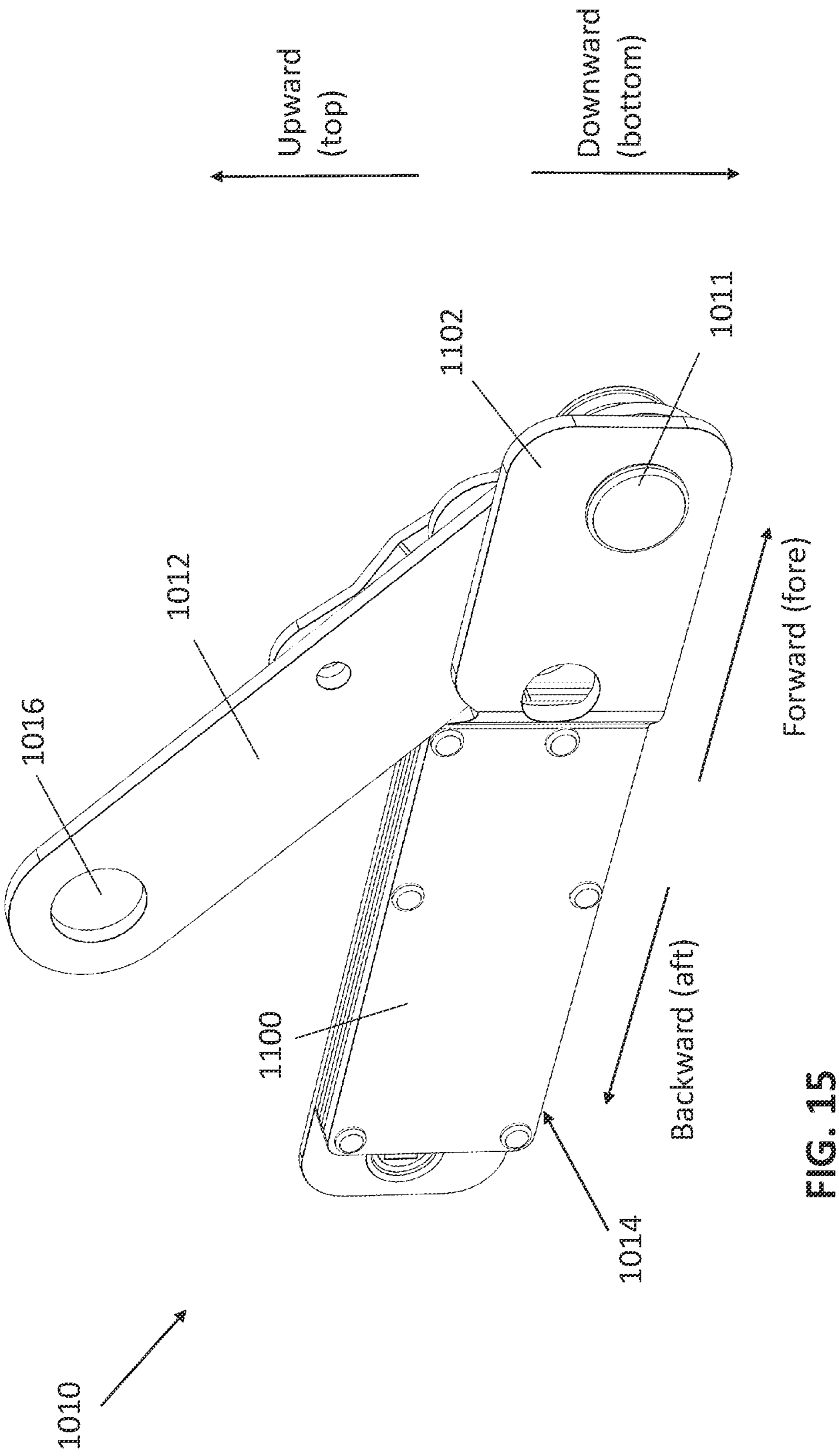
FIG. 15 is a perspective view of a second embodiment of the locking device from the outer side (upright position)
Figure 16:
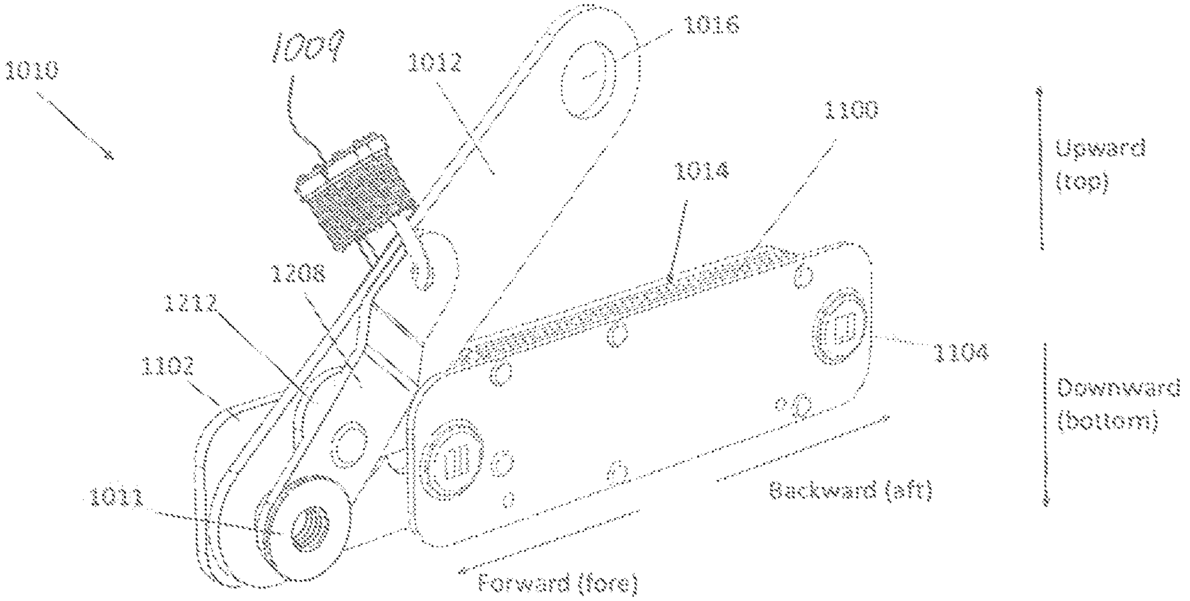
FIG. 16 is a perspective view of the second embodiment of the locking device from the inner side (upright position)

As best shown in FIGS. 1-4 and 15-16 (FIGS. 3-4 depict a first embodiment and FIGS. 15-16 depict a second embodiment of the present invention), the locking device 10 (or 1010) contains a base unit 14 (or 1014) and a pivotable unit 12 (or 1012) pivotally coupled to the base unit 14 (or 1014). The pivotable unit 12 (or 1012) is preferably a bar having one end that is pivotally coupled to the base unit 14 (or 1014) by a coupling 11 (or 1011), e.g. by a rivet or a nut/bolt. The coupling 11 (or 1011) allows the pivotable unit 12 (or 1012) to rotate relative to the base unit 14 (or 1014) by pivoting around the coupling 11 (or 1011). The other end of the pivotable unit 12 (or 1012) preferably contains a hole 16 (or 1016) (see e.g., FIG. 3) for coupling to the locking bar 6, when the locking device 10 (or 1010) is mounted on the waste container 2. Preferably, the locking bar 6 is fixed to the hole 16 (or 1016) of the pivotable unit 12 (or 1012) and extends approximately perpendicularly to the plane of the pivotable unit 12 (or 1012).

The base unit 14 (or 1014) includes a locking mechanism that is mounted in the interior of a housing 100 (or 1100). The housing 100 (or 1100) contains a forward end containing a tab 102 (or 1102) (as best shown in FIG. 4 or 15) for coupling to the pivotable unit 12 (or 1012). The housing 100 (or 1100) may also contain throughholes 104 (or 1104) for attaching the base unit 14 (or 1014) to the container 2 with mechanical fasteners, such as screws, nuts/bolts, or rivets.

Figure 5:
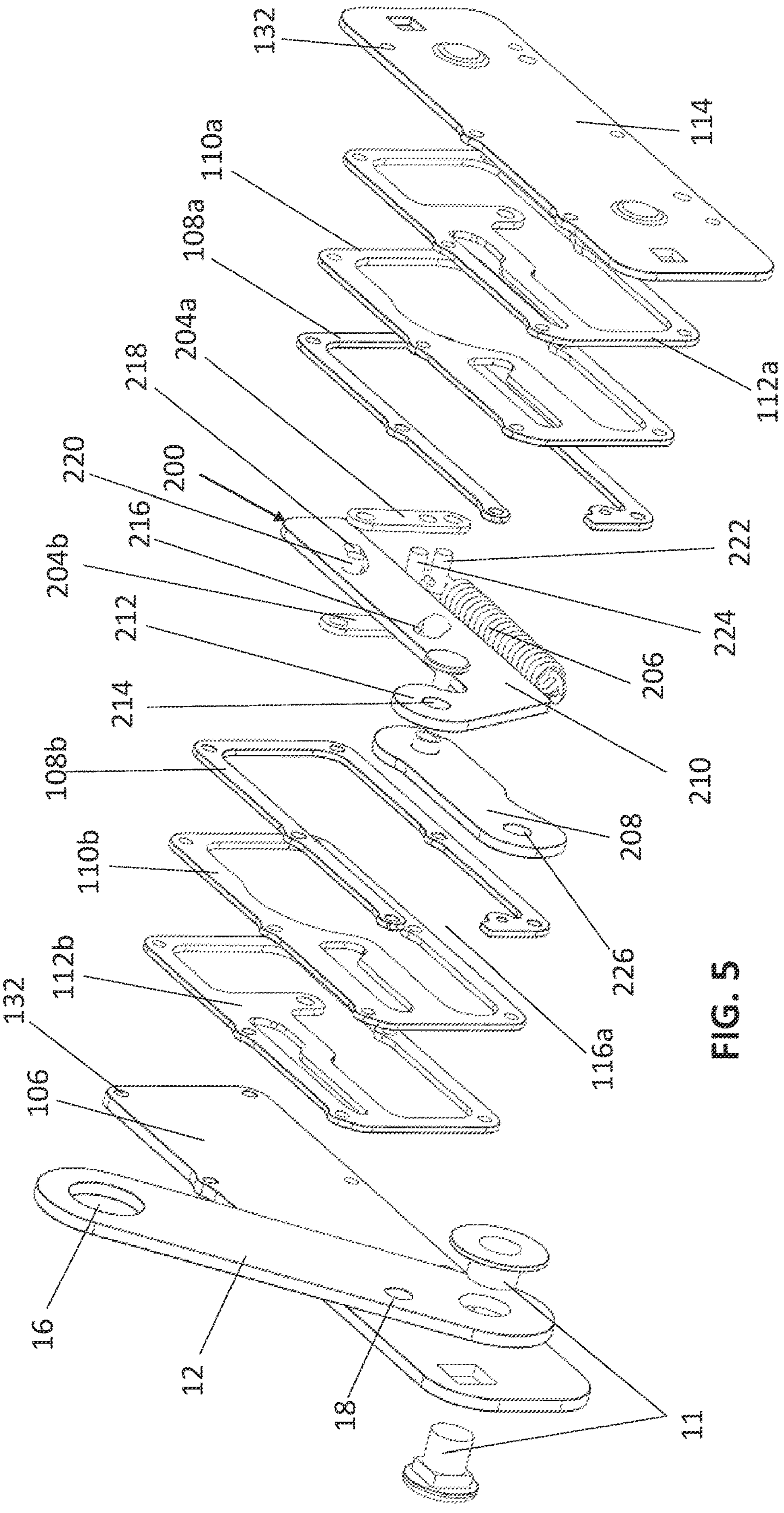
FIG. 5 is an exploded view of the first embodiment of the locking device.
Figure 6:
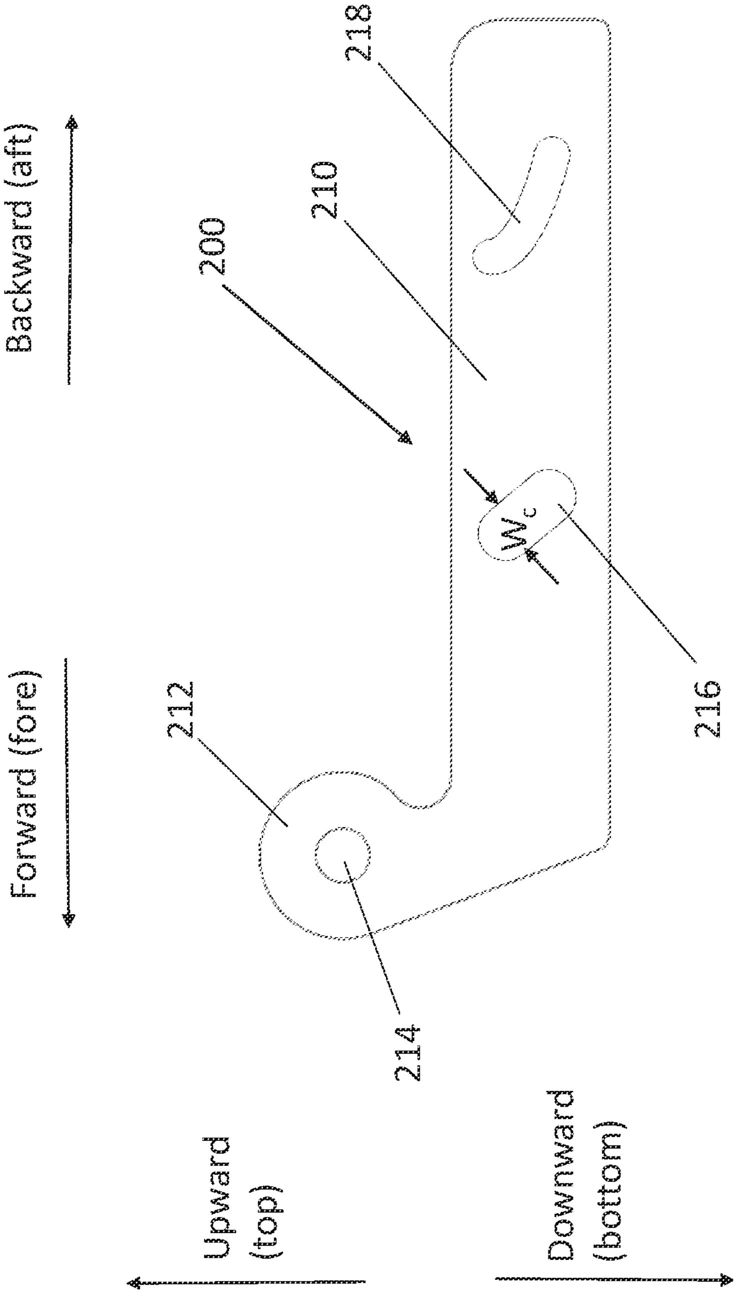
FIG. 6 is a side view of the first embodiment of the sliding member.
Figure 7:
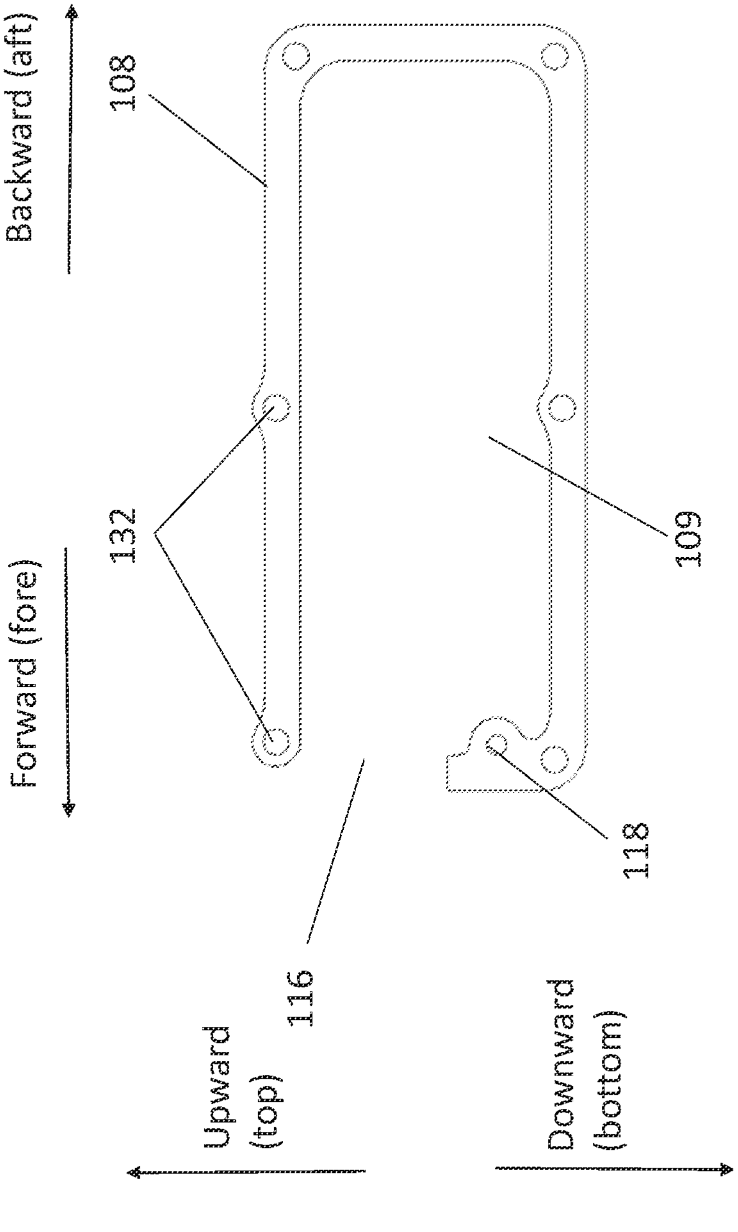
FIG. 7 is a side view of the first embodiment of the framing plate.
Figure 8:
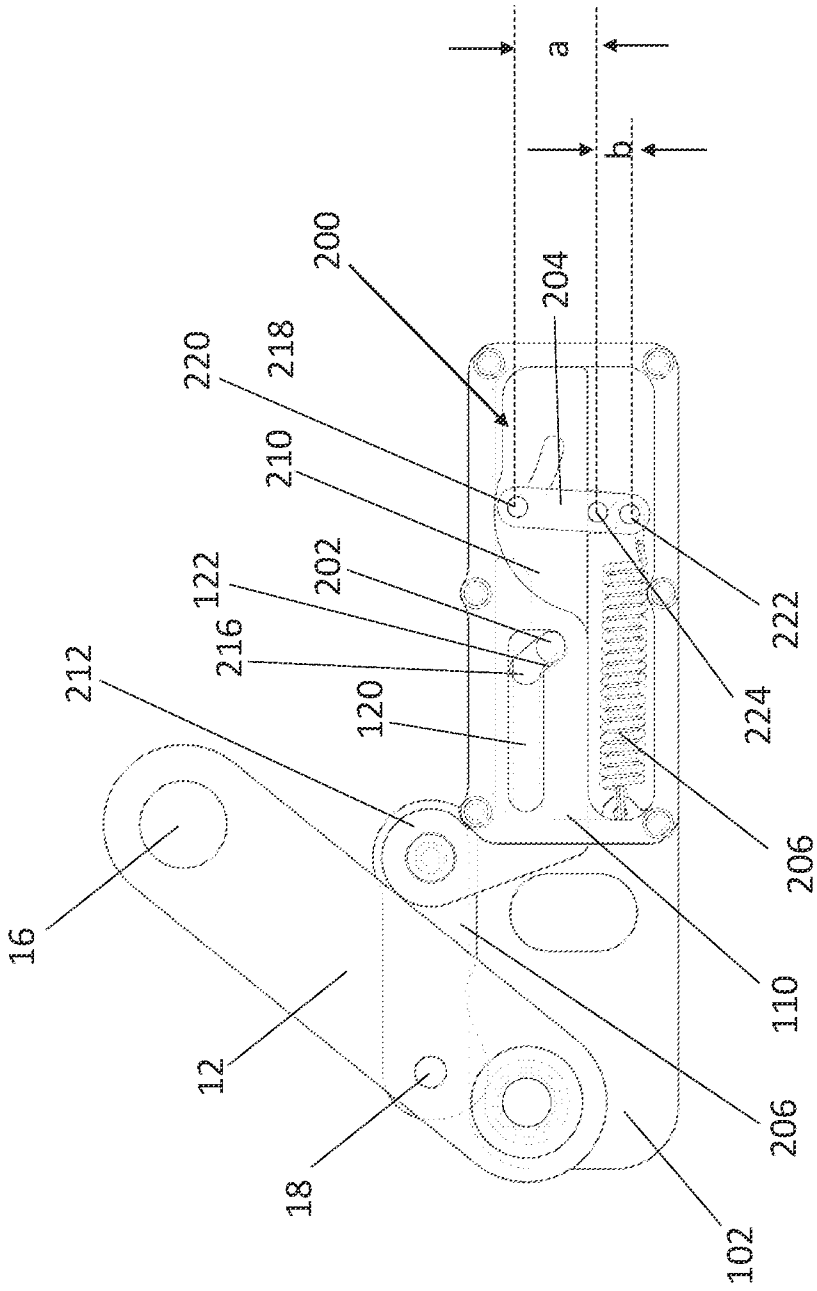
FIG. 8 is a side view of the first embodiment of the locking device from the inner side (with the anchor and inner plates removed)

FIGS. 3-14 depicts a first embodiment of the locking device 10. The locking mechanism of the first embodiment, as best shown in FIGS. 5 and 8, contains a sliding member 200, a rolling member 202, pivot levers **204*a* and 204*b*, a biasing member 206, and a connecting member 208. The sliding member 200 is a substantially flat plate mounted inside the housing 100 and slidable in a fore/aft direction relative to the housing 100. As best shown in FIG. 6, the sliding member 200 contains a main body 210 and a neck portion 212 extending from the main body 210**, preferably at the forward end, and non-movable relative thereto.

The neck portion 212 preferably contains a hole 214 for pivotally coupling to a back end of the connecting member 208 with a mechanical fastener, such as a rivet or nut/bolt. The coupling of the neck portion 212 to the connecting member 208 allows the connecting member 208 to freely rotate around that coupling. The main body 210 contains a first slot 216 for receiving the rolling member 202 therein. The first slot 216 is angularly disposed in the main body 210 for receiving the rolling member 202. The slot 216 is preferably angled at about 30 to 60° relative to the sliding direction of the sliding member 200. The angle is such that, when the locking device 10 is in its upright and locked position, the rolling member 202 is pulled by gravity to the bottom of the first slot 216 (see FIG. 8); and when the locking device 10 is sufficiently tipped forward (tipped forward at a predetermined angle), gravity pulls the rolling member 202 to the top of the first slot 216 (see FIG. 13).

The rolling member 202 may be a spherical ball. Alternatively, the rolling member 202 may be a cylindrical disc, capable of rolling within the first slot 216. It will be appreciated that the diameter of the rolling member 202 is the same or slightly smaller than a width Wc of the first slot 216 (as best shown in FIGS. 6 and 8), such that the rolling member 202 can roll freely within the first slot 216. As explained below, when the rolling member 202 is located at the bottom of the first slot 216, it cooperates with other parts within the housing 100 to block the sliding member 200 from sliding forwardly (the blocked position); and when the rolling member 202 is located at the top of the first slot 216, the sliding member 200 may freely slides in the forward direction (the unblocked position).

The main body 210, as best shown in FIGS. 5-6, also contains a second slot 218, preferably toward the back of the sliding member 200 in relation to the first slot 216, for coupling of the pivot levers **204*a* and 204*b* thereto. Although the drawings illustrate two pivot levers 204*a* and 204*b*, only one pivot lever is needed for the present invention. Henceforth, only one pivot lever is described and referred to as 204, although two pivot levers, one on each side of the sliding member 200, may also be used. The second slot 218 preferably has an upward crescent shape and is angularly disposed in the main body 210 for coupling with the pivot lever 204. A line connecting the ends of the second slot 218 is preferably angled at about 1 to about 89° relative to the sliding direction of the sliding member 200, more preferably about 10 to about 70°, most preferably about 20 to about 50°. A top shaft 220, passing through the second slot 218 and a hole at a top end of the pivot lever 204, connects the pivot lever 204 to the sliding member 200. The top shaft 220 is slidable within the second slot 218, as best shown in FIG. 8. When the sliding member 200 is in its aftmost position, the pivot lever 204 is preferably in an approximately vertical (top/bottom direction) position. The pivot lever 204 is coupled to the biasing member 206 at its bottom end, preferably via a bottom shaft 222, which passes through a hole at a bottom end of the pivot lever 204. The biasing member 206 preferably is a spring that biases the bottom end of the pivot lever 204 in the forward direction. The pivot lever 204 pivots around a pivot shaft 224, which preferably passes through a middle hole (locating between the top and bottom holes) on the pivot lever 204. The pivot shaft 224 is fixed relative to the housing 100 and allows the pivot lever 204 to pivot thereabout. The pivot shaft 224 preferably supports the bottom of the sliding member 200 and allows the sliding member 200 to slide thereon. As best illustrated in FIG. 8, the distance a between the top shaft 220 and the pivot shaft 224 is preferably greater than the distance b between the bottom shaft 222** and the pivot shaft. Thus, the a:b ratio is greater than 1, more preferably about 1.3:1 to about 5:1, most preferably about 1.5:1 to about 3:1. The preferred ranges given for the a:b ratio are based upon practical considerations, but a high ratio is most desirable.

As best shown in FIGS. 3 and 5, the connecting member 208 contains a hole 225 on the aft end for coupling to the neck portion 212 of the sliding member 200, as discussed above. The forward end of the connecting member contains a hole 226 matching a hole 18 on the pivotable unit 12. A pad lock 9, as best shown in FIG. 1, may engage both holes 226 and 18 to lock the pivotable unit 12 to the locking mechanism to prevent unauthorized access to the interior of the container 2. As shown in FIG. 5, the connecting member 208 may be formed as a flat bar; however, the connecting member 208 may also be a metal rod or a stiff member of various shapes.

As best illustrated in FIG. 5, the housing 100 is preferably made up of several substantially flat plates which are assembled to form the housing 100. The plates may be assembled together with mechanical fasteners, such as rivets, bolts/nuts, or screws, without requiring welds. The plates include an outer plate 106, framing plates **108*a* and 108*b*, blocking plates 110*a* and 110*b*, anchor plates 112*a* and 112*b*, and an inner plate 114. The outer plate 106 is the outermost plate farthest from the container 2 when the locking device 10 is mounted on the container 2. The pivotable unit 12 is mounted to the end tab 102 of the outer plate 106. The inner plate 114 is the innermost plate locating adjacent to the container 2 when the locking device 10 is mounted on the container 2. As used herein, “inner,” “inner side,” or the like refers to the side of the locking device that is closest to the container 2 when the locking device 10 is mounted on the container 2; and “outer,” “outer side,” or the like refers to the side of the locking device that is farthest from the container 2 when the locking device 10 is mounted on the container 2. Between the inner plate 114 and the outer plate 106, from the center out, are the framing plates 108*a* and 108*b*, the blocking plates 110*a* and 110*b*, and the anchor plates 112*a* and 112*b*. Thus, the framing plates 108*a* and 108*b* are located at the center and adjacent to each other; the blocking plate 110*a* is adjacent to the framing plate 108*a*; the blocking plate 110*b* is adjacent to the framing plate 108*b*; the anchor plate 112a is adjacent to the blocking plate 110a; and the anchor plate 112b is adjacent to the blocking plate 110b. Because the framing plates 108a and 108b are mirror images of each other, only one plate will be discussed in detail below. The same is also true of the blocking plates 110a and 110b, and the anchor plates 112a and 112**b.

FIG. 7 illustrates the details of the framing plate 108. The framing plate 108 has a hollow center 109, frames the perimeter of the housing 100, and contains a perimeter cutout portion 116. When assembled, the cutout portion 116 forms an opening to allow the sliding member 200 to protrude therethrough so that the neck portion 212 is located outside of the housing 100 so that the neck portion 212 with the hole 214 is disposed outside the housing 100 (see FIGS. 8, 10, 13 and 14). The opening formed by cutout portion 116 also allows a portion of the sliding member 200 to slide in and out of the housing 100 (compare FIGS. 8 and 14). The framing plate 108 also include a hole 118 for coupling of the biasing member 206 thereto. Thus, one end of the biasing member 206 is coupled to the hole 118 on the framing plate, while the other end of the biasing member 206 is coupled to the bottom shaft 222 or directly to the bottom portion of the pivot lever 204.

Figure 9:
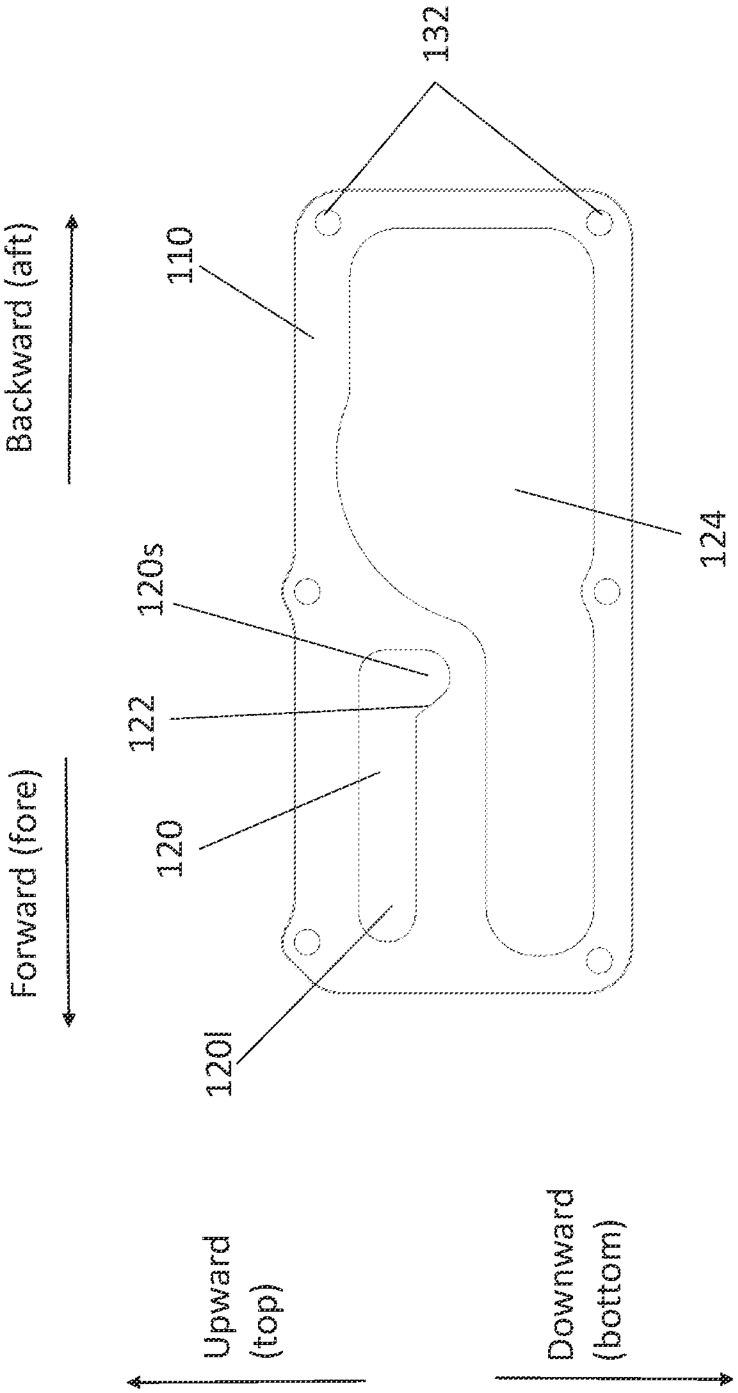
FIG. 9 is a side view of the blocking plate of the first embodiment.

FIG. 9 illustrates the details of the blocking plate 110. The blocking plate 110 contains a L-shaped cutout 120. The cutout 120 contains a substantially horizontal long leg 1201 and a substantially vertical short leg 120s. The short leg 120s contains an angled or slanted surface 122 matching the angle of the first slot 216 in the sliding member 200. When the locking device 10 is in its closed position and upright (as best shown in FIG. 8), the angled surface is in registry with the first slot 216. In that orientation, the rolling member 202 is in its blocked position (at the bottom of the first slot 216), such that the rolling member 202 spans the thickness of sliding member 200 and protrude into the blocking plate 110, and is lodged in the short leg 120s behind the angled surface 122 (as best illustrated in FIG. 8). In that position, the angled surface 122 and the rolling member 202 cooperate to block the sliding member 200 from sliding in the forward direction. The blocking plate 110 may also contain a large cutout 124 to accommodate parts of the locking mechanism, such as the biasing member 206 and the pivot lever(s) 204. The large cutout 124 also reduces the weight of the locking device 10.

Figure 10:
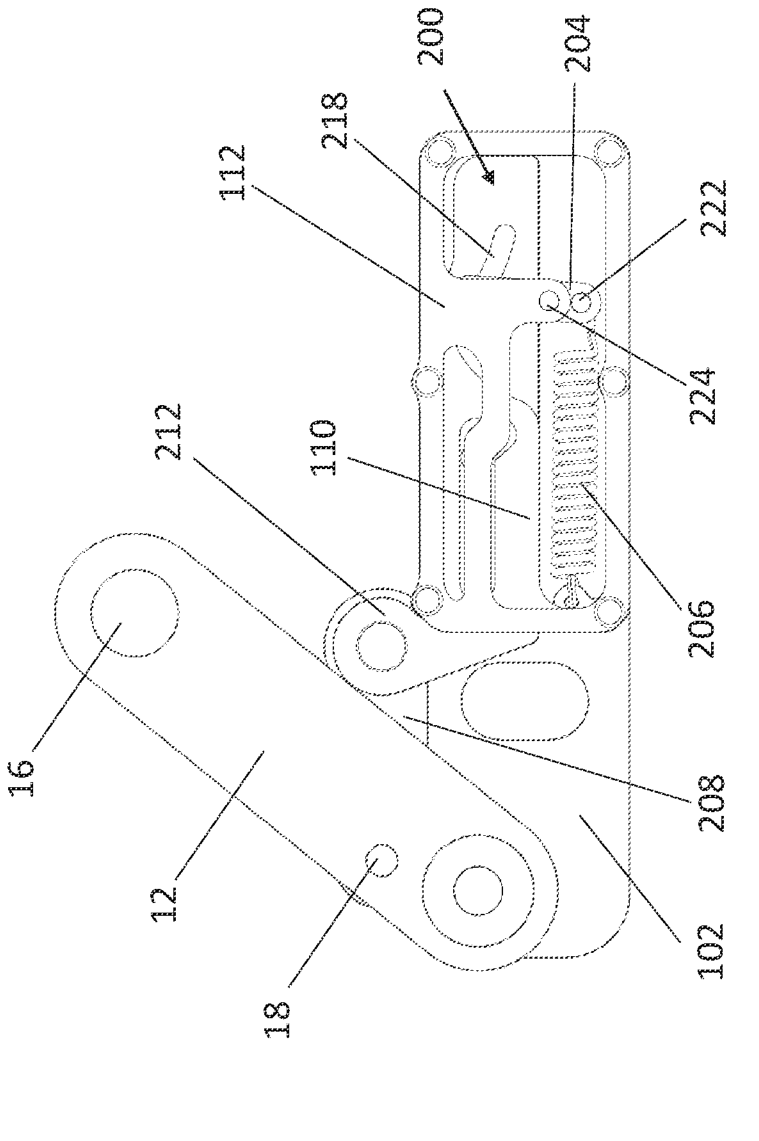
FIG. 10 is a side view of the first embodiment of the locking device from the inner side (with the inner plate removed)
Figure 11:
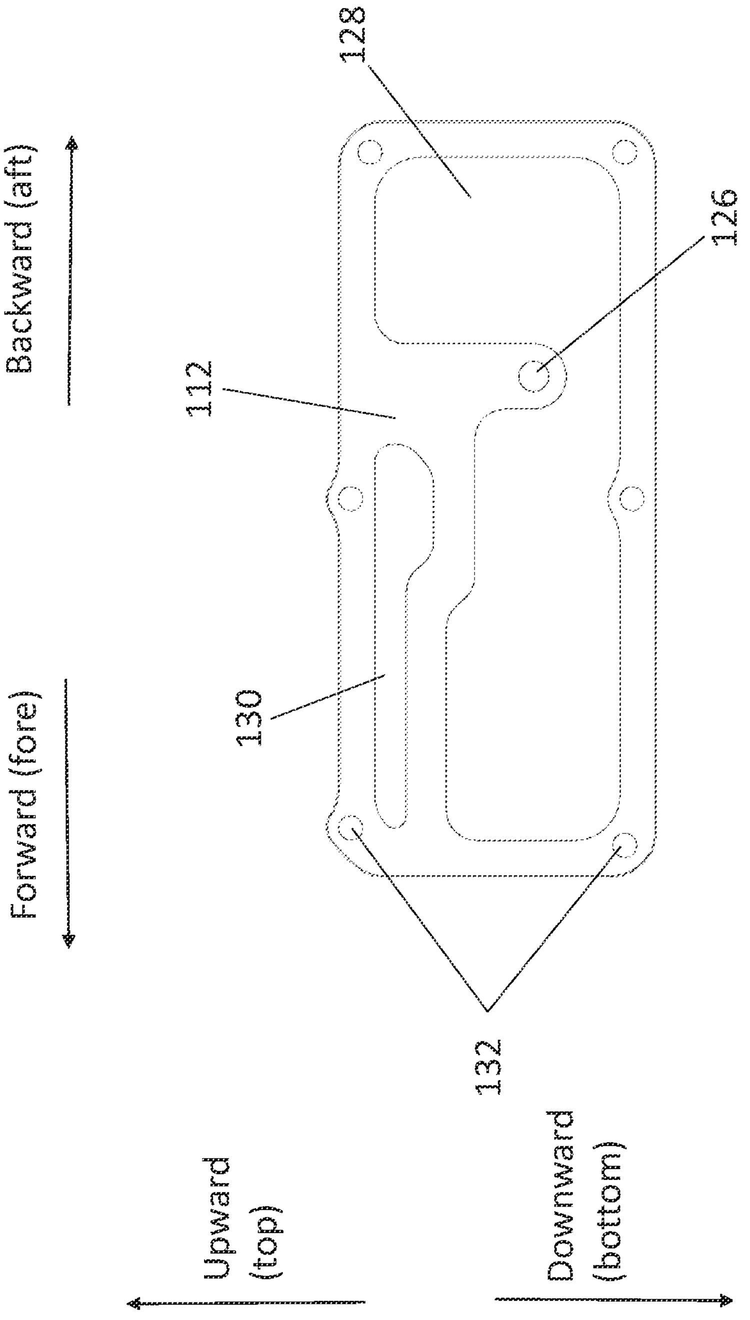
FIG. 11 is a side view of the anchor plate of the first embodiment.

FIG. 11 illustrates the details of the anchor plate 112. The main function of the anchor plate 112 is to provide an anchor point for fixing the pivot shaft 224 to the housing 100. Accordingly, the anchor plate 122 preferably contains a hole 126 for anchoring one end of the pivot shaft 224 and to fix the pivot shaft 224 in place. The pivot shaft 224 passes perpendicularly through the hole 126 and is retained therein, preferably by friction. The hole 126 fixes the pivot shaft 224 in place to allow the pivot lever 204 to pivot thereon. As shown in FIGS. 10-11, the anchor plate 112 may also have hollow cutouts 128 and 130. Those cutouts 128 and 130 reduce the overall weight of the locking device 10, but do not have a locking function.

Figure 12:
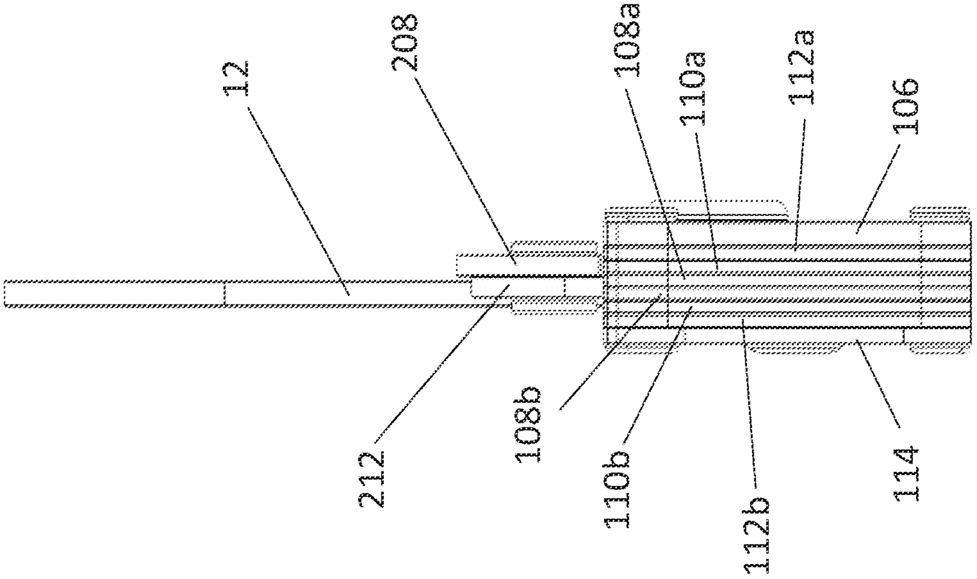
FIG. 12 is a rear view of the first embodiment of the locking device showing the assembly of the plates.
Figure 13:
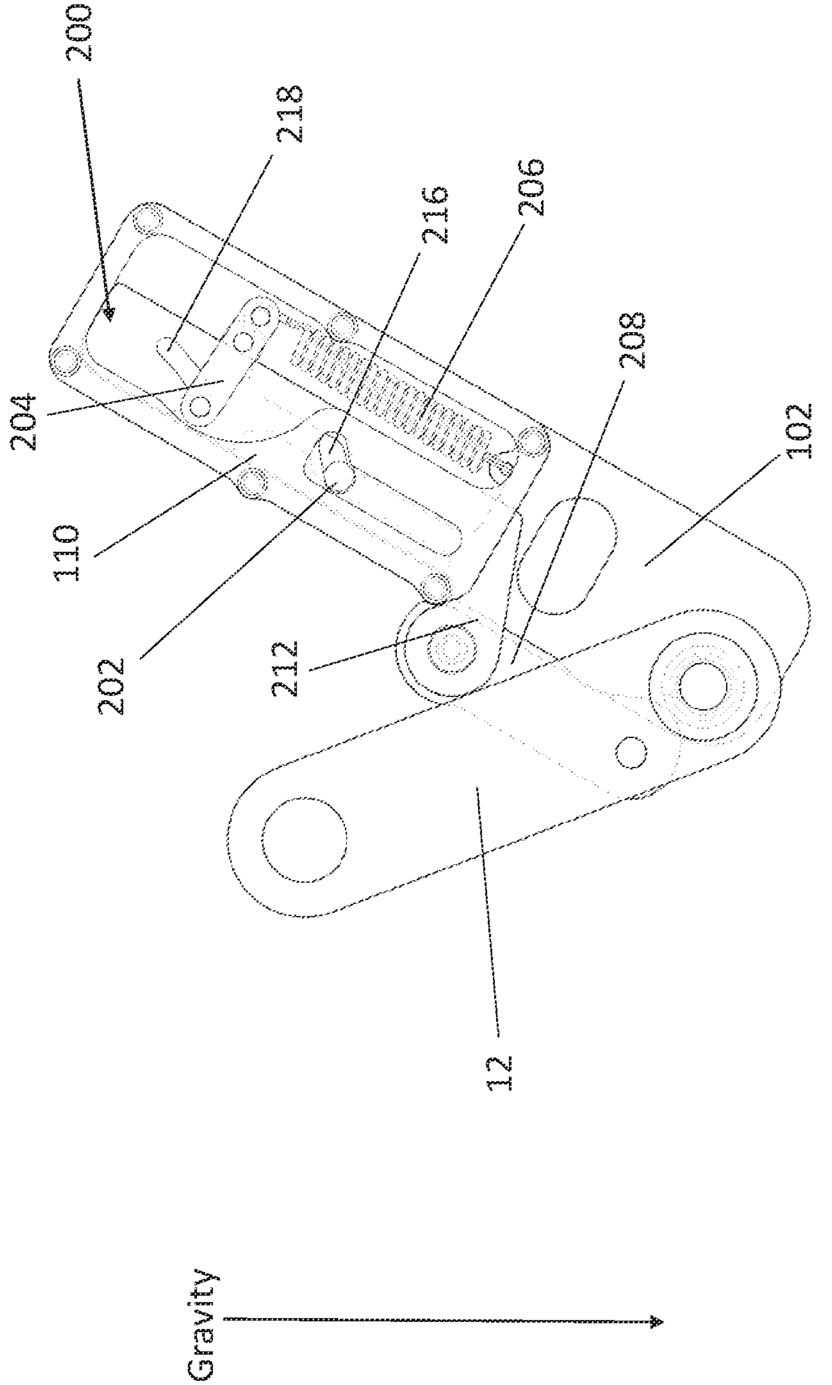
FIG. 13 is a side view of the first embodiment of the locking device from the inner side (with the anchor and inner plates removed) while being tilted.

Each of the plates preferably contains matching holes 132 for assembly of the housing by mechanical fasteners. For assembly, the plates are stacked so that matching holes 132 are aligned with each other; and fasteners, such as rivets, are inserted through the holes to secure the plates together. The order of the plates from the outer side to inner side, as best shown in FIG. 12, is as follows: the outer plate 106, the anchor plate 112a, the blocking plate 110a, the framing plate 108a, the framing plate 108b, blocking plate 110b, the anchor plate 112b, and the inner plate 114. Essentially, the housing 100 contains two halves: 1) an inside half containing the framing plate 108b, the blocking plate 110b, the anchor plate 112b, and the inner plate 114; and 2) an outside half containing the framing plate 108a, the blocking plate 110a, the anchor plate 112a, and the outer plate 106. The two halves are assembled together to contain the locking mechanism therebetween. Although several plates are described herein as an exemplary embodiment, a skilled person in the art would recognize that the functions of two or more plates may be combined into a single plate. For example, the blocking plate 110 and the anchor plate 112 may be combined as a single plate, or the anchor plate 112 and the outer plate may be combined as single plate, or all the plates on one half of the lock may be combined so that the lock includes two assembled halves. The multiple plate design allows the locking device 10 to be assembled without welding and to reduce weight.

In use, to prevent unauthorized access to the interior of the container, the lock 9, such as a padlock, as best shown in FIG. 1, is placed through the hole 18 of the pivotable unit 12 and the hole 226 of the connecting member 208. When the lock is in place and the container 2 is in its upright position (FIG. 1), the pivotable unit 12 cannot be rotated away from the container to its opened position, because the rolling member 202 is in its blocking position at the bottom of the first slot 216 (FIG. 8). In that position, the rolling member 202 abuts against the angled surface 122 in the blocking plate 110, preventing the sliding member 200 from sliding forwardly. To manually open the container, the lock may be removed from holes 18 and 226 to disconnect the pivotable unit 12 from the locking mechanism, thereby allowing a user to manually rotate the pivotable unit 12 forward and away from the lid 4 to the opened position.

Figure 14:
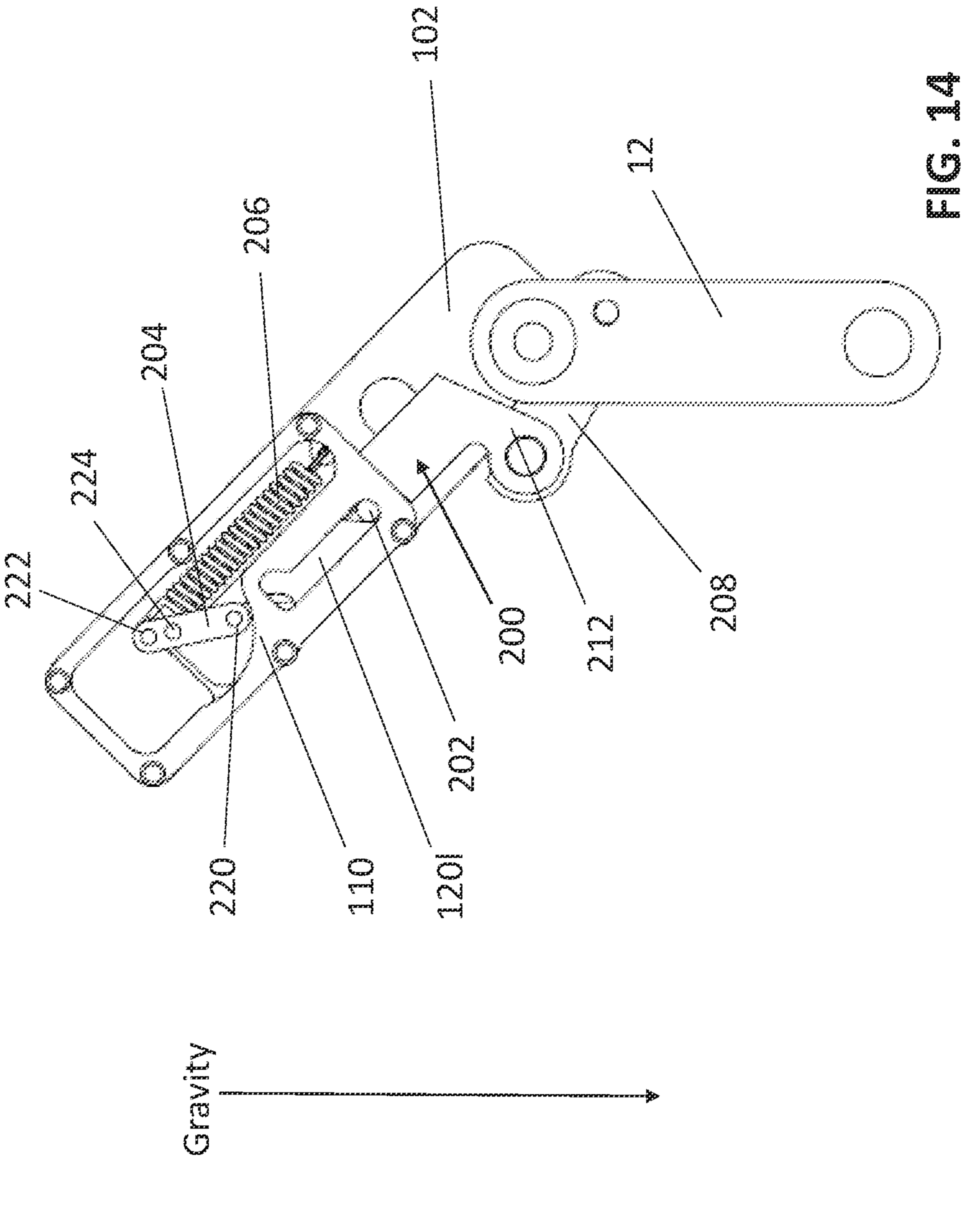
FIG. 14 is a side view of the first embodiment of the locking device in the opened position from the inner side the (with the anchor and inner plates removed)

When it is desirable to remove the contents of the container 2 while the lock is in place, the container 2 may be grabbed by a lifting mechanism, e.g. of a waste collection truck (not shown), and moved from the upright position (FIG. 1) to the tilted or dumping position (FIG. 2). When in the upright position, the rolling member 202 is in the blocking position (as shown in FIG. 8). Accordingly, the pivotable unit 12 is prevented from pivoting to its open position. However, when the waste container 2 is tipped forward, gravity pulls the rolling member 202 from the blocking position (shown in FIG. 8) to the release position (shown in FIG. 13). In the release position, the rolling member 202 is freed from the angled surface 122 and no longer obstructs the forward displacement of the sliding member 200. Consequently, the pivotable unit 12 may pivot (by gravity on the pivotable unit 12 and the locking bar 6) to its open position, as shown in FIG. 14. The pivotable unit 12 may rotate by gravity from the closed position to the open position. As the pivotable unit 12 rotates forwardly, the sliding member 200, which is connected to the pivotable unit 12 via the connecting member 208 and the lock, is linearly displaced in the forward direction (as shown in FIG. 14). The lid 4 of the waste container 2 may then swing open by gravity, permitting the contents of the waste container 2 to be emptied. When the sliding member 200 slides forwardly, the pivot lever 204 pivots on the pivot shaft 224, allowing the top shaft 220 to slide within the second slot 218 toward the bottom end of the second slot 218 (FIG. 14). In that position, because of the a:b ratio, the biasing force pulling on the pivot lever 204 (and thus the sliding member 200) is not sufficient to overcome the gravitational force on the pivotable unit 12. That way, as the waste stream is being emptied from the container 2, the pivotable unit 12 and the locking bar 6 are not pulled into that waste stream. When the container 2 is returned to its upright position, the biasing member 206 pulls sliding member 200 aft, by acting on the pivot lever 204, thereby pulling the pivotable unit into the closed position. In the upright, closed position, gravity pulls the rolling member 202 to its blocking position at the bottom of the first slot 216.

FIGS. 15-21 depicts a second embodiment of the locking device 1010. Elements of the second embodiment receive reference numerals that are 1000 more than the reference numerals for corresponding elements in the first embodiment. For example, the pivotable unit 1012 of the second embodiment corresponds to the pivotable unit 12 of the first embodiment. The second embodiment may not contain all elements of the first embodiment and vice versa. The second embodiment may contain elements that are not found in the first embodiment and vice versa.

Thus, similar to the first embodiment, the second embodiment of the locking device 1010 contains a base unit 1014, a pivotable unit 1012 coupled to the base unit 1014 by a coupling 1011, e.g. a rivet or a nut/bolt. The other end of the pivotable unit 1012 preferably contains a hole 1016 for coupling to the locking bar 6, when the locking device 1010 is mounted on the waste container 2.

The base unit 1014 includes a locking mechanism that is mounted in the interior of a housing 1100. The housing 1100 contains a forward end containing a tab 1102 (as best shown in FIG. 15) for coupling to the pivotable unit 1012. The housing 1100 may also contain throughholes 1104 for attaching the base unit 1014 to the container 2 with mechanical fasteners, such as screws, nuts/bolts, or rivets.

Figure 17:
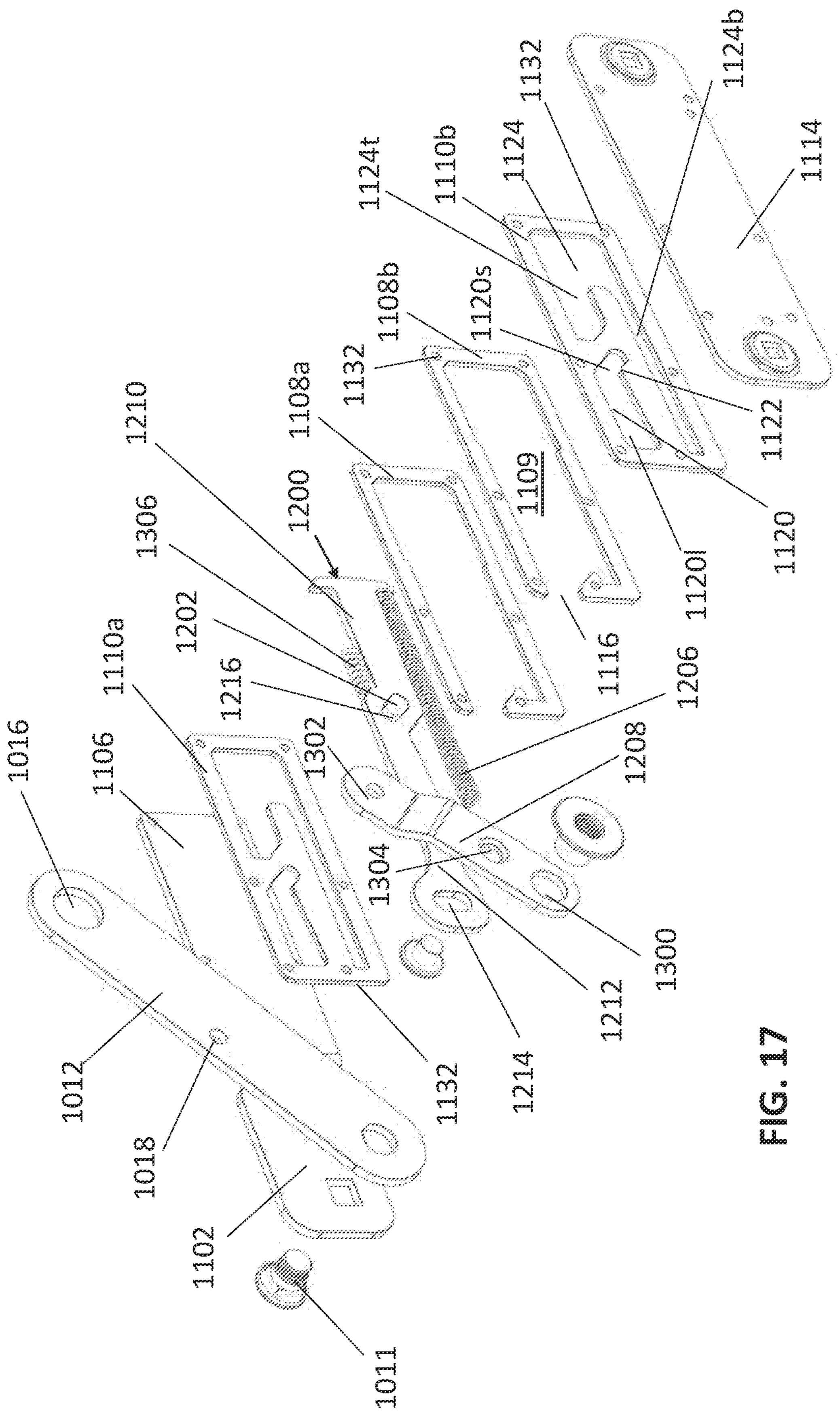
FIG. 17 is an exploded view of the second embodiment of the locking device.

The locking mechanism of the second embodiment, as best shown in FIG. 17, contains a sliding member 1200, a rolling member 1202, a biasing member 1206, and a connecting member 1208. The sliding member 1200 is a substantially flat plate mounted inside the housing 1100 and slidable in a fore/aft direction relative to the housing 1100. As best shown in FIG. 17, the sliding member 1200 contains a main body 1210 and a neck portion 1212 extending from the main body 1210, preferably at the forward end. The neck portion 1212 preferably contains a hole 1214 for pivotally coupling to the connecting member 1208 with a mechanical fastener, such as a rivet or nut/bolt. The coupling of the neck portion 1212 to the connecting member 1208 allows the connecting member 1208 to freely rotate around that coupling. The main body 1210 contains a first slot 1216 for receiving the rolling member 1202 therein. The first slot 1216 is angularly disposed in the main body 1210 for receiving the rolling member 1202, in the same manner as the first slot 216 of the first embodiment. Thus, the angle of the first slot 1216 is preferably the same as that for the first slot 216. The angle is such that, when the locking device 1010 is in its upright and locked position, the rolling member 1202 is pulled by gravity to the bottom of the first slot 1216 (see FIG. 18); and when the locking device 1010 is sufficiently tipped forward (tipped forward at an angle, preferably about 30 to about) 60°, gravity pulls the rolling member 1202 to the top of the first slot 1216 (see FIG. 20).

The rolling member 1202 is preferably identical to the rolling member 202 of the first embodiment described above.

Figure 18:
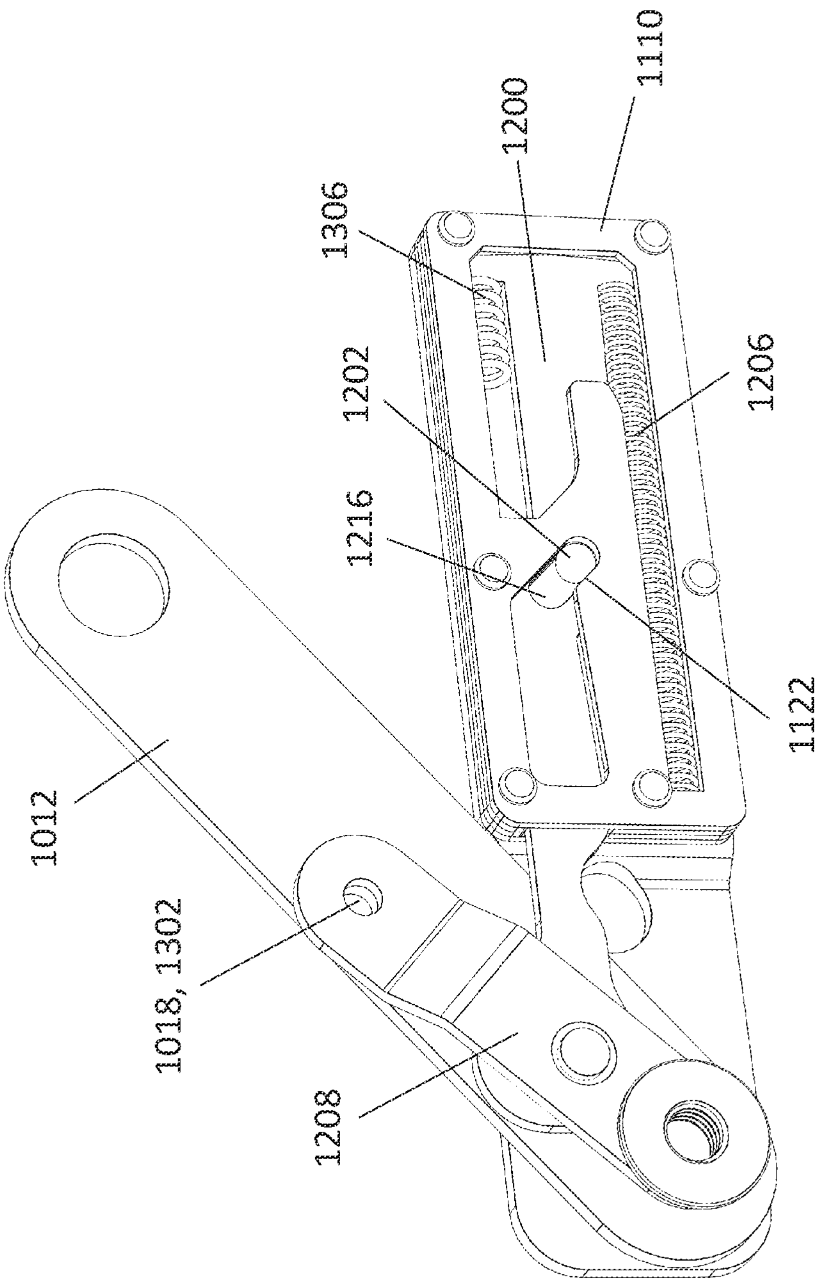
FIG. 18 is a perspective view of the second embodiment of the locking device from the inner side with the inner plate removed (upright position)
Figure 19:
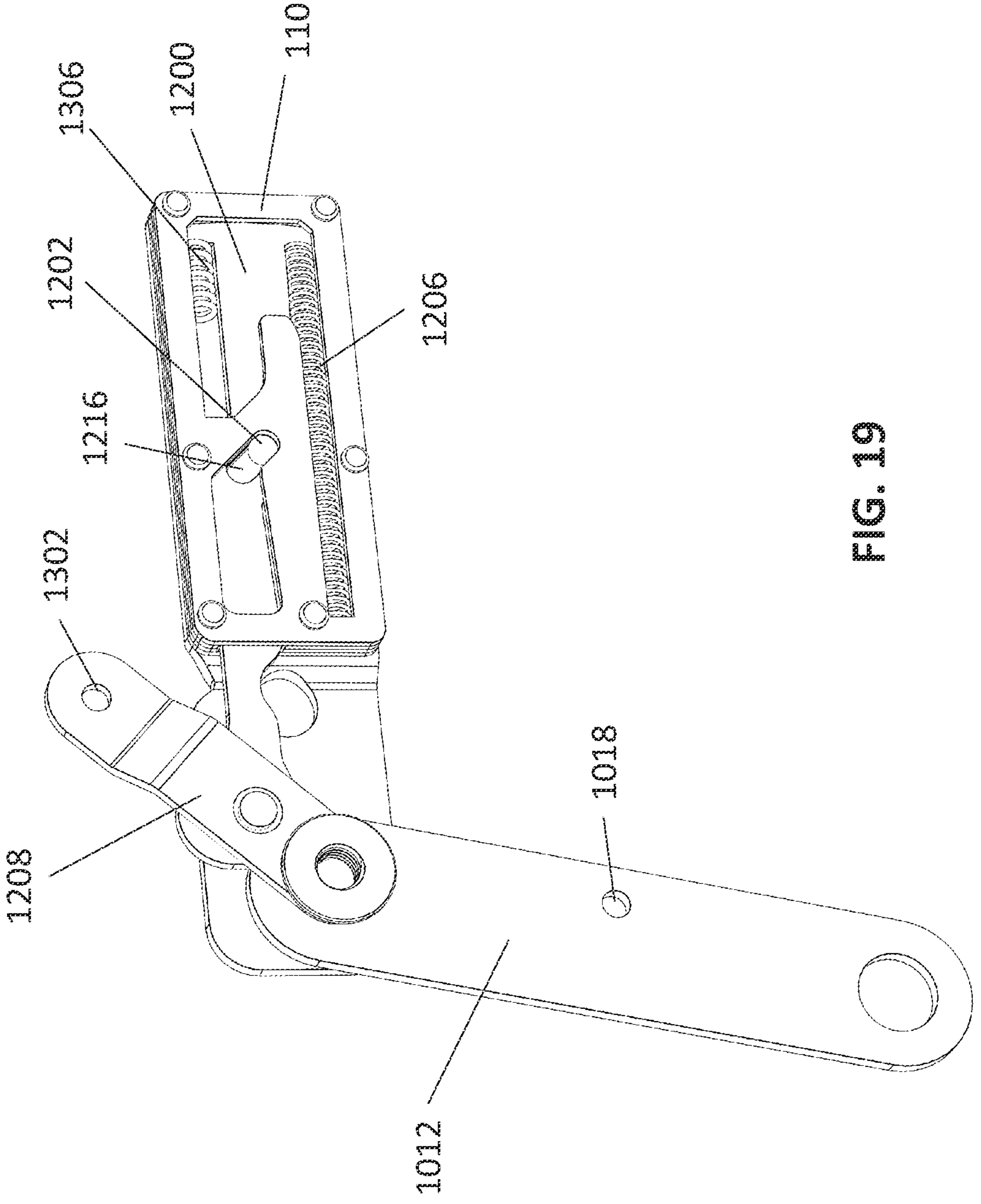
FIG. 19 is a perspective view of the second embodiment of the locking device from the inner side with the inner plate removed (upright position) with the pivotable unit rotated to the open position.
Figure 20:
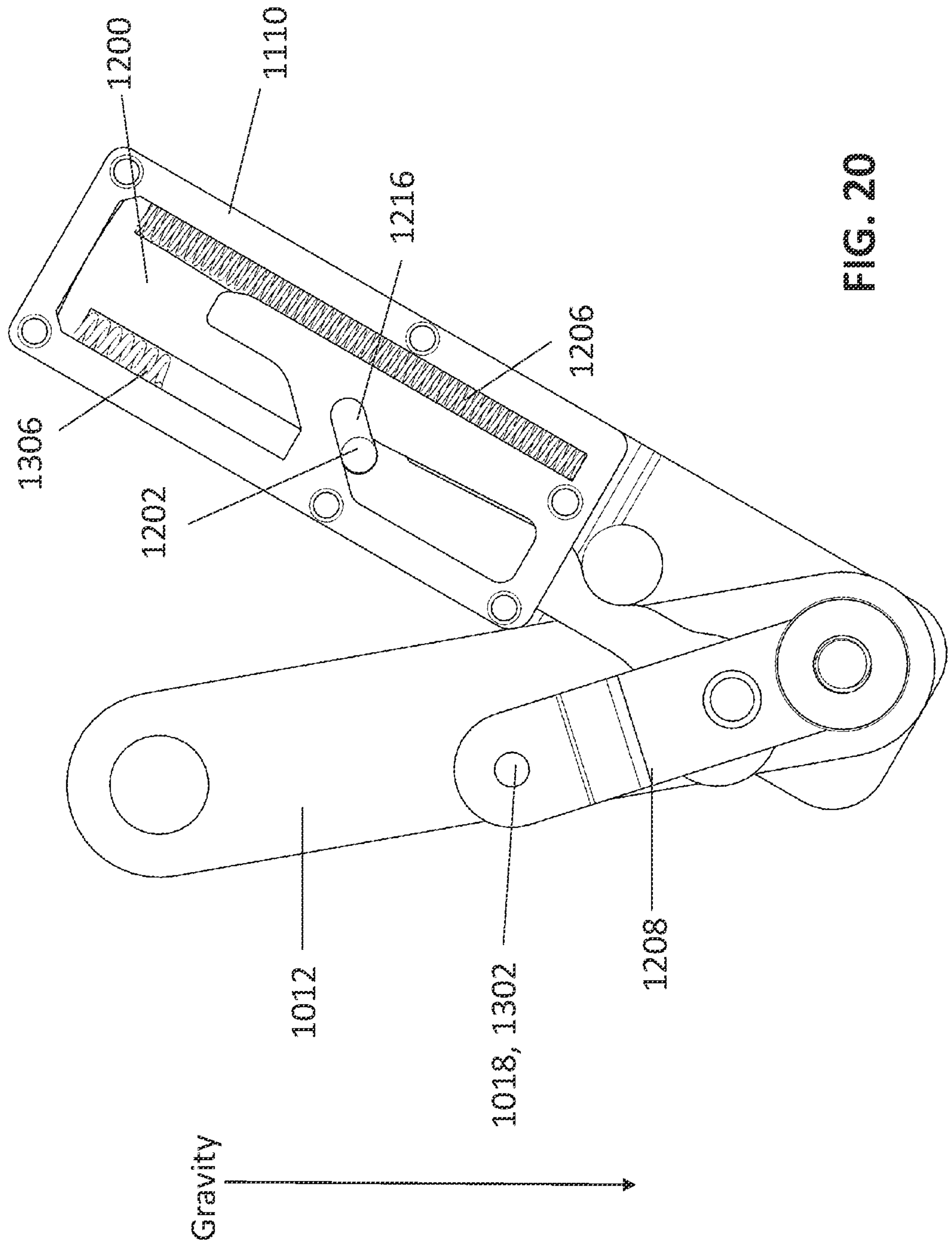
FIG. 20 is a side view of the second embodiment of the locking device from the inner side with the inner plate removed (tilted position)

As best shown in FIGS. 16-17, the connecting member 1208 preferably is in the shape of a bar mounted substantially parallel to the pivotable unit 1012. As best shown in FIG. 17, the connecting member 1208 contains three holes: a bottom hole 1300, a top hole 1302, and a middle hole 1304 between the top and bottom holes 1302 and 1300. The bottom hole 1300 allows the bottom of the connecting member 1208 to be pivotably mounted to the pivotable unit 1012 by the coupling 1011. The coupling 1011 forms a fixed point allowing the pivotable unit 1012 and the connecting member 1208 to pivot relative to each other and relative to the base unit 1014. The middle hole 1304 allows for coupling of the neck portion 1212 of the sliding member 1200 to the connecting member 1208, e.g., by a fastener, such as a nut/bolt, screw, rivet, etc. The coupling at the middle hole 1304 allows the connecting member 1208 and the neck portion 1212 to pivot relative to each other by rotating around the coupling. The top hole 1302 at the top end of the connecting member matches a hole 1018 on the pivotable unit 1012. A pad lock 1009, such as shown in FIG. 18, or the like, may engage both holes 1302 and 1018 to lock the pivotable unit 1012 to the locking mechanism to prevent unauthorized access to the interior of the container 2. Although the Figures show the connecting member 1208 as a bar, the connecting member 1208 may also be a metal rod or a stiff member of various shapes.

Like the first embodiment, the housing 1100 of the second embodiment is preferably made up of several flat plates. As shown in FIG. 17, the plates of the second embodiment preferably includes an outer plate 1106, framing plates 1108*a* and 1108*b*, blocking plates 1110*a* and 1110*b*, and an inner plate 1114. The outer plate 1106 is the outermost plate farthest from the container 2 when the locking device 1010 is mounted on the container 2. The pivotable unit 1012 is mounted to the end tab 1102 of the outer plate 1106. The inner plate 1114 is the innermost plate located adjacent the container 2 when the locking device 1010 is mounted on the container 2. Between the inner plate 1114 and the outer plate 1106, from the outside in, are the first blocking plate 1110*a*, the first framing plate 1108*a*, the second framing plate 1108*b*, and the second blocking plate 1110*b*. Thus, the framing plates 1108*a* and 1108*b* are located at the center and adjacent to each other; the first blocking plate 1110*a* is sandwiched between the first framing plate 1108*a* and the outer plate 1106; the second blocking plate 1110*b* is sandwiched between the second framing plate 1108*b* and the inner plate 1114. Because the framing plates 1108*a* and 1108*b* are mirror images of each other, only one plate will be discussed in detail below. The same is also true of the blocking plates 1110*a* and 1110*b*.

The framing plate 1108 is substantially the same as the framing plate 108 of the first embodiment. The framing plate 1108 has a hollow center 1109, frames the perimeter of the housing 1100, and contains a perimeter cutout portion 1116. When assembled, the cutout portion 1116 forms an opening to allow the sliding member 1200 to protrude therethrough so that the neck portion 1212 is located outside of the housing 1100 so that the neck portion 1212 with the hole 1214 is disposed outside the housing 1100 (see, e.g., FIGS. 17-21). The opening formed by cutout portion 1116 also allows a portion of the sliding member 1200 to slide in and out of the housing 100 (compare FIGS. 18 and 21).

Similar to the blocking plate 110 of the first embodiment, the blocking plate 1110 of the second embodiment, as best shown in FIG. 17, contains a L-shaped cutout 1120. The cutout 1120 contains a horizontal long leg 11201 and a vertically angled short leg 1120*s*. The short leg 1120*s* contains an angled or slanted surface 1122 matching the angle of the first slot 1216 in the sliding member 1200. Although the short leg 1120*s* of the L-shaped cut out 1120 is shown in FIG. 17 as matching the first slot 1216, it may also have the same configuration as that of the short leg 120*s* of the first embodiment as long as the angled surface 1122 is present. Likewise, the short leg 120*s* of the first embodiment may also have the same configuration as the short let 1120*s* shown in FIG. 17.

When the locking device 1010 is in its closed position and upright (as best shown in FIG. 18), the angled surface 1122 is in registry with the first slot 1216. In that position, as explained above for the first embodiment, the rolling member 1202 is in its blocked position (at the bottom of the first slot 1216), such that the rolling member 1202 spans the thickness of sliding member 1200 and protrudes into the blocking plates 1110*a* and 1110*b*, and is lodged in the short leg 1120*s* behind the angled surface 1122 (as best illustrated in FIG. 18). In that position, the angled surface 1122 and the rolling member 1202 cooperate to block the sliding member 1200 from sliding in the forward direction. The blocking plate 1110 may also contain a large cutout 1124 to accommodate parts of the locking mechanism, such as the biasing member 1206. Preferably, the large cut out 1124 includes a top portion 1124*t* and a bottom portion 1124*b*. The bottom portion 1124*b* is configured to accommodate the biasing member 1206. The top portion 1124*t* is configured to accommodate an optional second biasing member 1306. The biasing members 1206 and 1306 are explained in further detail below.

As in the first embodiments, the plates 1106, 1110*a*, 1110*b*, 1108*a*, 1108*b*, and 1114 are assembled with fastener (s), such as rivet(s), placed through their matching holes 1132 after stacking the plates 1106, 1110*a*, 1110*b*, 1108*a*, 1108*b*, and 1114 so that the matching holes 1132 are aligned with each other. The order of the plates for the second embodiment, from the outer side to inner side, as best shown in FIG. 17, is as follows: outer plate 1106, the first blocking plate 1110*a*, the first framing plate 1108*a*, the second framing plate 1108*b*, the second blocking plate 1110*b*, and the inner plate 1114. The assembled plates contain the locking mechanism therebetween. Although several plates are described herein as an exemplary embodiment, a skilled person in the art would recognize that the functions of two or more plates may be combined into a single plate.

When assembled, the sliding member 1200, the rolling member 1202, and the biasing member 1206 are housed within the housing 1100 formed by the plates. As best shown in FIGS. 18-21, the biasing member 1206 is positioned within the bottom portion 1124*b* of the large cut out 1124 of the blocking plates 1110*a* and 1110*b*, and has a front end that abuts the housing 1100 and a rear end that abuts the sliding member 1200. The biasing member 1206 preferably is a spring that biases the sliding member 1200 in the backward direction. The biasing member 1206 preferably has its rear end abutting the sliding member 1200 and its front end abutting the housing 1100. The biasing member 1206 in constantly in a compressed (albeit not complete compression) state, so that even when the sliding member 1200 is in its rearmost position, the biasing member 1206 still abuts the sliding member 1200 and the housing 1100.

In use, to prevent unauthorized access to the interior of the container 2, the lock 1009, such as a padlock, as best shown in FIG. 18, is placed through the hole 1018 of the pivotable unit 1012 and the hole 1302 of the connecting member 1208. When the lock is in place and the container 2 is in its upright position (FIG. 1), the pivotable unit 1012 cannot be rotated away from the container 2 to its opened position, because the rolling member 1202 is in its blocking position at the bottom of the first slot 1216 (see FIG. 18). In that position, the rolling member 1202 abuts against the angled surface 1122 in the blocking plate 1110, preventing the sliding member 1200 from sliding forwardly. To manually open the container, the lock may be removed from holes 1018 and 1302 to disconnect the pivotable unit 1012 from the locking mechanism, thereby allowing a user to manually rotate the pivotable unit 1012 forward and away from the lid 4 to the opened position (see FIG. 19).

Figure 21:
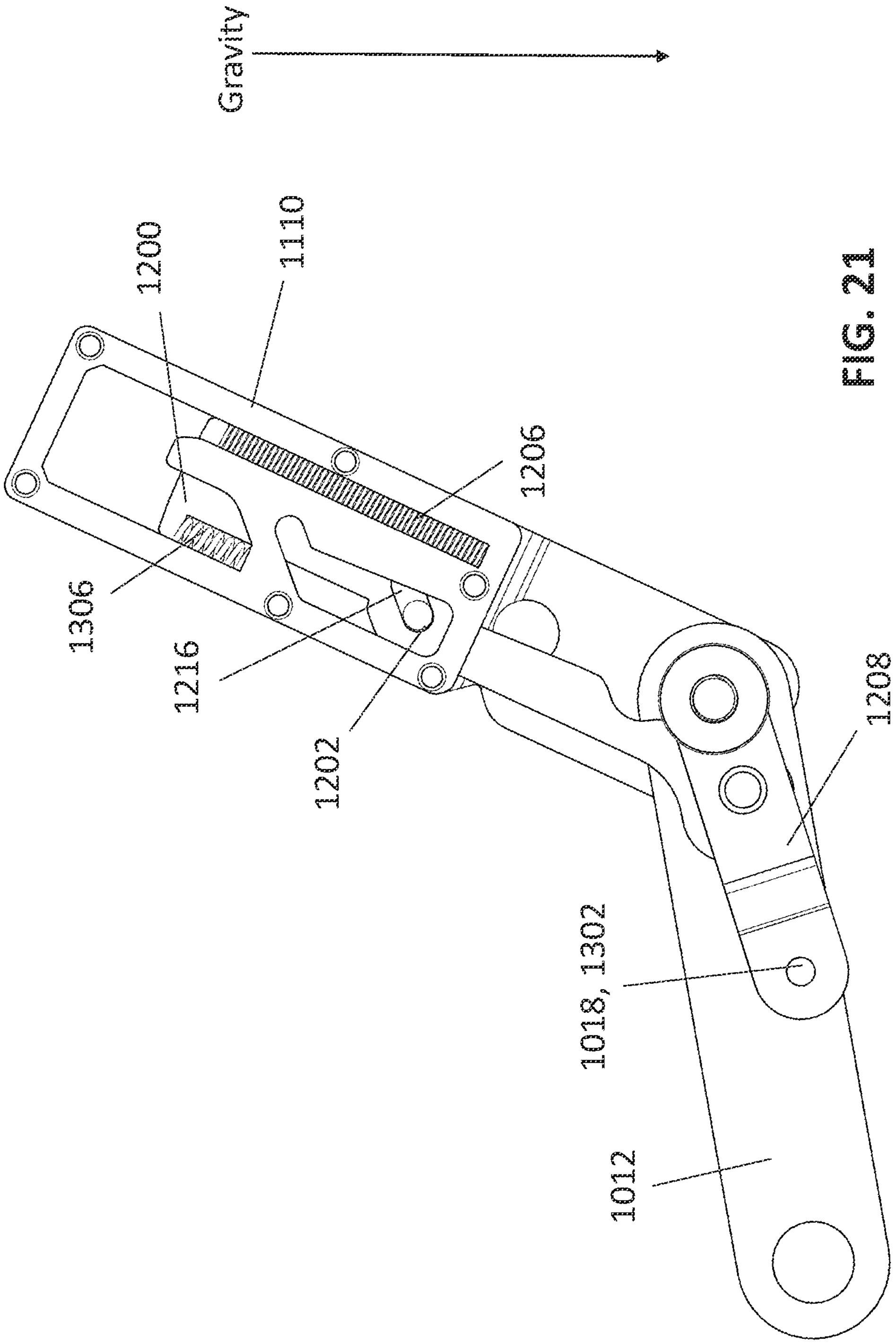
FIG. 21 is a side view of the second embodiment of the locking device from the inner side with the inner plate removed (tilted position) with the pivotable unit rotated to the open position.

When it is desirable to remove the contents of the container 2 while the lock is in place, the container 2 may be grabbed by a lifting mechanism, e.g. of a waste collection truck (not shown), and moved from the upright position (FIG. 1) to the tilted or dumping position (FIG. 2). When in the upright position, the rolling member 1202 is in the blocking position (as shown in FIG. 18). Accordingly, the pivotable unit 1012 is prevented from pivoting to its open position. However, when the waste container 2 is tipped forward, gravity pulls the rolling member 1202 from the blocking position (shown in FIG. 18) to the release position (shown in FIG. 20). In the release position, the rolling member 1202 is freed from the angled surface 1122 and no longer obstructs the forward displacement of the sliding member 1200. Consequently, the pivotable unit 1012 may pivot (by gravity on the pivotable unit 1012 and the locking bar 6) to its open position, as shown in FIG. 21. The pivotable unit 1012 may rotate by gravity from the closed position to the open position. As the pivotable unit 1012 rotates forwardly, the sliding member 1200, which is connected to the pivotable unit 1012 via the connecting member 1208 and the lock, is linearly displaced in the forward direction (as shown in FIG. 21), while at the same time compressing the biasing member 1206, which may be a coil spring. The lid 4 of the waste container 2 may then swing open by gravity, permitting the contents of the waste container 2 to be emptied.

In certain embodiments, the force pulling the sliding member 1200 forwardly may be too strong, even for the compressed biasing member 1206, and may slam the sliding member 1200 into parts of the housing 1100 causing damage to the housing 1100 and/or the sliding member 1200. To cushion the slamming of the sliding member 1200, the second biasing member 1306 may be used. The second biasing member 1306 floats (i.e., is disposed) on top of the sliding member 1200 and within the top portion 1124*t* of the large cutout 1124 of the blocking plates 1110*a*, 1110*b*. As the sliding member 1200 slides forward, the free end (front end) of the second biasing member 1306 contacts the housing 1100 instead of the sliding member 1200 to cushion and to prevent the slamming of the sliding member 1200 against the housing 1100 (see FIG. 21). The second biasing member 1306 is preferably a stiff coil spring having a spring constant greater than the spring constant of the biasing member 1206. When the container 2 is returned to its upright position, the compressed biasing member 1206 pushes sliding member 1200 aft, thereby pulling the pivotable unit 1012 into the closed position. In the upright, closed position, gravity pulls the rolling member 1202 to its blocking position at the bottom of the first slot 1216 (see FIG. 18).

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A locking device, comprising:

a) a housing having an opening;

b) a flat and unitary sliding member slidably mounted in the housing, the sliding member having a main body and a neck portion extending from the main body, the main body and neck portion non-movable relative to each other, the main body having a first slot angularly disposed therein, the sliding member protruding through the opening in the housing so that the neck portion is disposed outside the housing;

c) a rolling member disposed in the first slot, wherein the rolling member is carried by the sliding member as the sliding member slides in a fore/aft direction relative to the housing; and d) a biasing member disposed within the housing and biasing the sliding member in a first direction.

2. The locking device of claim 1, wherein the neck portion has a hole therethrough disposed outside the housing.

3. The locking device of claim 2, wherein the biasing member is a spring having a first end abutting the sliding member and a second end abutting the housing.

4. The locking device of claim 2, wherein the housing comprises a plurality of plates stacked together.

5. The locking device of claim 4, wherein the plurality of plates comprises an outer plate, a first blocking plate, a first framing plate, a second framing plate, a second blocking plate, and an inner plate, and the plates are stacked in the following sequential order: the outer plate, the first blocking plate, the first framing plate, the second framing plate, the second blocking plate, and the inner plate.

6. The locking device of claim 5, wherein the first and second blocking plates are mirror images of each other, and the first and second framing plates are mirror images of each other.

7. The locking device of claim 5, wherein each of the first and second framing plates comprises a hollow center, and a perimeter cutout portion that forms the opening in the housing when the plates are assembled.

8. The locking device of claim 5, wherein each of the first and second blocking plates contains a L-shaped cutout having a horizontal long leg and a vertically angled short leg, the short leg contains an angled surface in registry with the angle of the first slot on the sliding member, wherein when the rolling member is positioned at the bottom of the first slot, the rolling member is in contact with the angled surface to block the sliding member from sliding relative to the housing.

9. The locking device of claim 4, wherein the plates are held together by rivets, screws, nuts and bolts, or combinations thereof.

10. The locking device of claim 2, further comprising a pivotable unit and a connecting member, with a mechanical fastener extending through the hole in the neck portion of the sliding member, and wherein the connecting member is configured to couple the sliding member to the pivotable unit with a lock.

11. The locking device of claim 10, wherein the connecting member is a plate or a rod.

12. The locking device of claim 11, wherein a first end of the connecting member is pivotably coupled to the pivotable unit, a second end is configured to couple to the pivotable unit with the lock, and a middle portion between the first and second ends is coupled to the neck portion of the sliding member.

13. The locking device of claim 12, wherein when the second end is coupled to the pivotable unit with the lock, the connecting member is parallel to the pivotable unit.

14. The locking device of claim 1, wherein when the rolling member is positioned at a bottom portion of the first slot, the sliding member is blocked from sliding forwardly.

15. The locking device of claim 1, further comprising a second biasing member disposed in a space on top of the sliding member.

16. A container assembly, comprising:

a) a container body;

b) a hinged lid pivotally mounted to the container body; and the locking device of claim 1 mounted to the container body.

17. The container assembly of claim 16, further comprising:

a) a support member mounted to the container body opposing the locking device;

b) a pivoting arm pivotally mounted to the support member; and c) a locking bar having a first end fixed to a pivotable unit and a second end fixed to the pivoting arm, wherein when the pivotable unit is in a closed position, the locking bar is positioned over the hinged lid to prevent access to the container body, and when the pivotable unit is in an open position, the locking bar is spaced away from the hinged lid to allow opening of the container.

18. The container assembly of claim 17, wherein the locking bar is fixed to an end of the pivotable unit so as to extend perpendicularly to the plane of the pivotable unit.

19. The locking device of claim 1, wherein the sliding member is formed as a single-piece component.

20. A method for making a waste container, comprising the steps of:

a) providing a container body with a hinged lid pivotally mounted to the container body; and b) mounting the locking device of claim 1 to the container body.

* * * * *